(12) United States Patent
Kuroiwa et al.

(10) Patent No.: US 10,642,405 B2
(45) Date of Patent: May 5, 2020

(54) DRIVE CONTROL DEVICE FOR A DISPLAY HAVING DISPLAY ELEMENTS AND TOUCH DETECTION ELECTRODES

(71) Applicant: Synaptics Japan GK, Tokyo (JP)

(72) Inventors: Tsuyoshi Kuroiwa, Tokyo (JP); Takayuki Noto, Tokyo (JP); Mitsunori Takanashi, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 1 day.

(21) Appl. No.: 15/460,773

(22) Filed: Mar. 16, 2017

(65) Prior Publication Data

US 2017/0315659 A1 Nov. 2, 2017

(30) Foreign Application Priority Data

Apr. 28, 2016 (JP) .................. 2016-090789

(51) Int. Cl.
*G06F 3/041* (2006.01)
*G09G 3/36* (2006.01)
*G06F 3/043* (2006.01)

(52) U.S. Cl.
CPC .......... *G06F 3/0416* (2013.01); *G06F 3/0412* (2013.01); *G09G 3/3677* (2013.01); *G06F 3/043* (2013.01); *G09G 2310/0202* (2013.01); *G09G 2310/08* (2013.01); *G09G 2360/12* (2013.01); *G09G 2360/18* (2013.01)

(58) Field of Classification Search
None
See application file for complete search history.

(56) References Cited

U.S. PATENT DOCUMENTS

| 2011/0210949 | A1* | 9/2011 | Yamazaki | G09G 3/3648 345/204 |
| 2014/0160067 | A1* | 6/2014 | Kim | G06F 3/0416 345/174 |
| 2014/0210775 | A1* | 7/2014 | Ota | G06F 3/0412 345/174 |
| 2015/0097769 | A1* | 4/2015 | Russell | G06F 1/1652 345/156 |

(Continued)

FOREIGN PATENT DOCUMENTS

| JP | 2014512606 A | 5/2014 |
| JP | 2014146093 A | 8/2014 |
| JP | 2016045329 A | 4/2016 |

*Primary Examiner* — Amr A Awad
*Assistant Examiner* — Donna V Lui
(74) *Attorney, Agent, or Firm* — Patterson + Sheridan, LLP

(57) ABSTRACT

The drive control device includes a display control part and a touch control part. The display control part includes a control circuit operable to control first and second frame modes, and a clock pulse generator operable to produce a display line clock signal in synchronization with a display line switching cycle. The control circuit changes display and non-display drive terms in start timing on an individual display frame period basis in the first frame mode. In the second frame mode, each display frame period includes only one display drive term; the display drive term is not interrupted by a non-display drive term halfway. The second frame mode is arranged so that the cycle of the display line clock signal in synchronization with the display line switching cycle is made longer than that in the first frame mode.

20 Claims, 21 Drawing Sheets

(56) References Cited

U.S. PATENT DOCUMENTS

| | | | |
|---|---|---|---|
| 2015/0310820 A1* | 10/2015 | Jiang | G09G 3/3674 |
| | | | 345/173 |
| 2016/0034060 A1 | 2/2016 | Lin et al. | |
| 2016/0189603 A1* | 6/2016 | Lee | G09G 3/3258 |
| | | | 345/212 |
| 2017/0010739 A1* | 1/2017 | Ito | G06F 3/0416 |
| 2017/0221553 A1* | 8/2017 | Ishizu | G11C 11/401 |

* cited by examiner

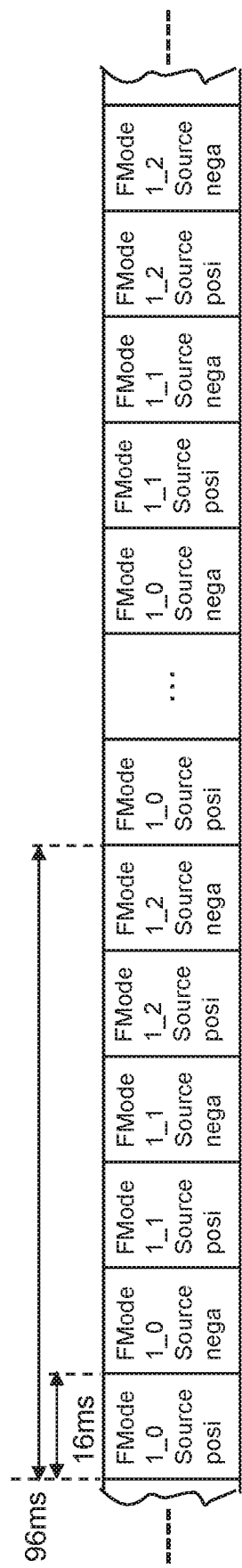

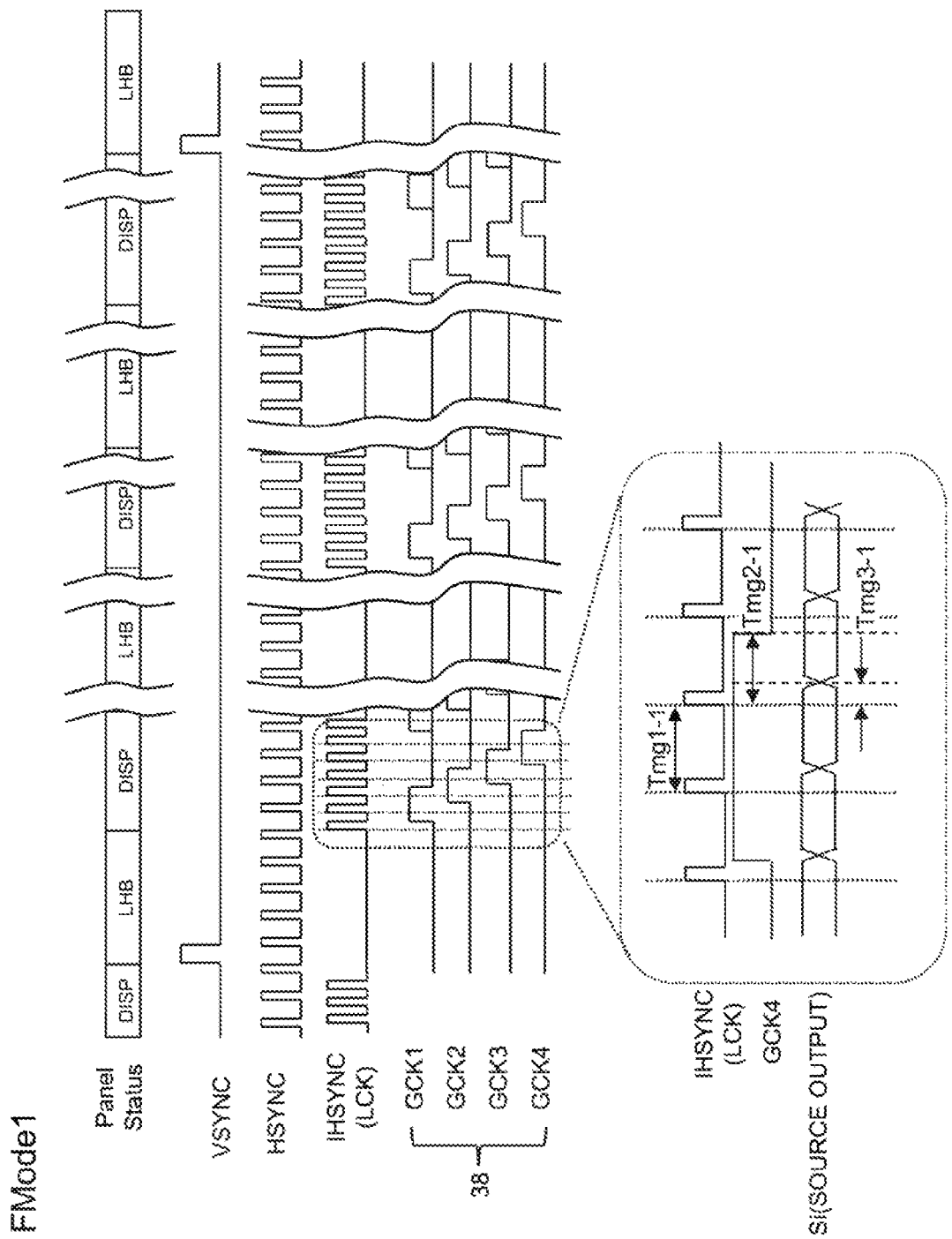

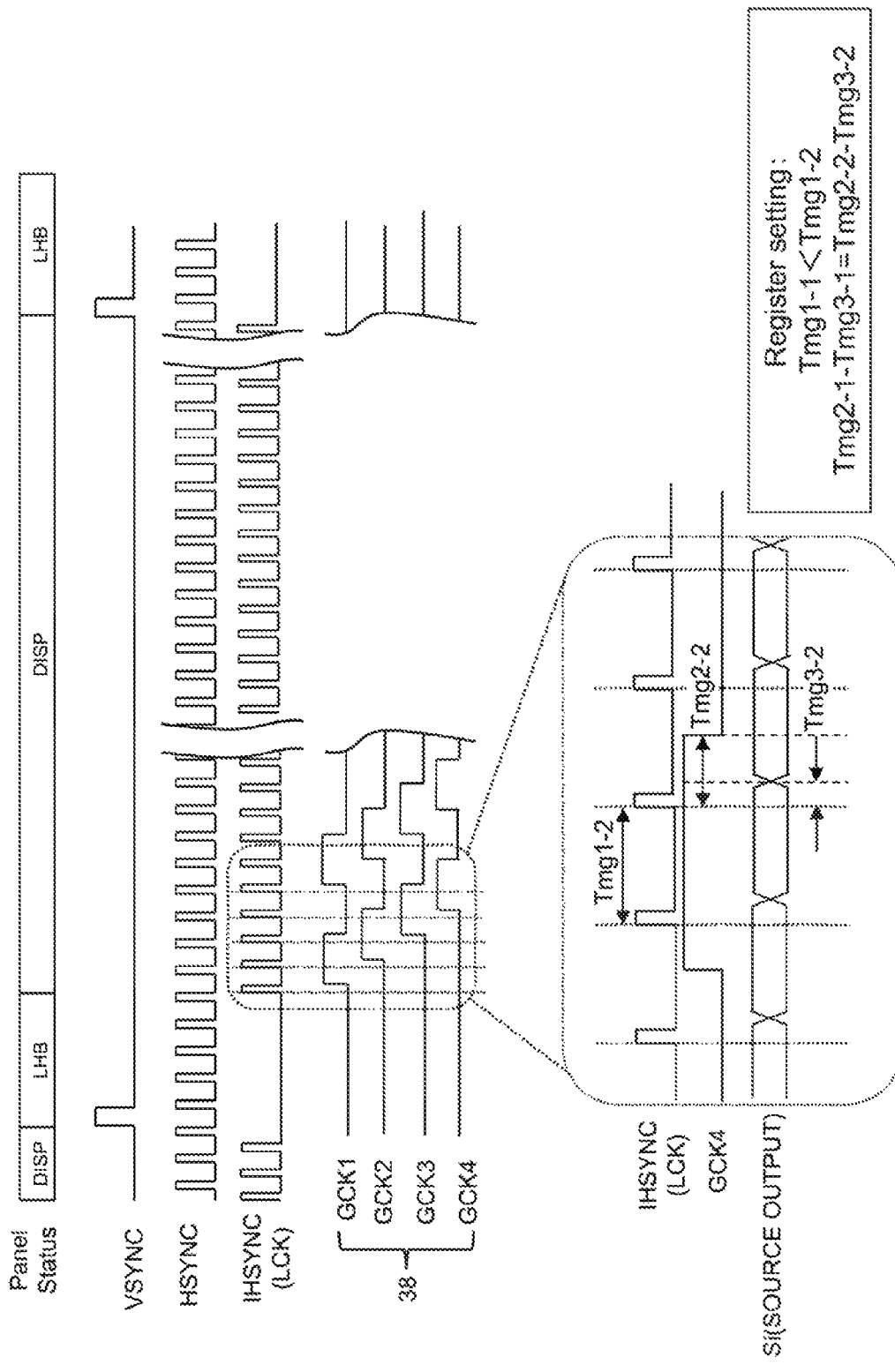

DRIVE CONTROL DEVICE FOR A DISPLAY HAVING DISPLAY ELEMENTS AND TOUCH DETECTION ELECTRODES

CROSS-REFERENCE TO RELATED APPLICATIONS

The present application claims priority from Japanese application JP 2016-090789 filed on Apr. 28, 2016, the content of which is hereby incorporated by reference into this application.

BACKGROUND

The present disclosure relates to a drive control device operable to drive and control a panel module for display and touch detection and a piece of electronic equipment arranged by mounting the drive control device on a panel module, and further relates to a technique useful in application for the increase in display quality in a portable information terminal device, e.g. a tablet or a smart phone.

A portable information terminal device, such as a tablet or a smart phone, has a panel module disposed on a surface; the panel module is arranged by putting together or integrally forming a display panel and a touch panel. Such a portable information terminal device is able to determine, from touch coordinates, a touch operation performed on a surface of the touch panel by a finger or the like according to screen display on the display panel in the event of the touch operation. In these days, electrostatic capacitance type touch panels have been in wide use; an electrostatic capacitance type touch panel is arranged to make discrimination between a touch and no touch based on the change or difference in detection signal according to the value of a stray capacitance on detection electrodes arranged like an array.

A liquid crystal panel has scan electrodes and signal electrodes, which are arranged to cross each other, and thin film transistors disposed at their intersecting points; the thin film transistors are each referred to as "TFT". The thin film transistors are arranged in such a way that the gate of each transistor is connected to the corresponding scan electrode, the source is connected to the corresponding signal electrode, and a liquid crystal element and a storage capacitor which make a sub-pixel are connected between the drain and a common electrode, whereby respective pixels are formed. In display control, the scan electrodes are activated sequentially. Thus, the thin film transistors are turned ON for each scan electrode and an electric current is caused to flow between the source and drain, during which signal voltages put on the source electrode lines are applied to the respective liquid crystal elements, consequently bringing them into a transmission state.

With a display panel and a touch panel put together or integrally formed, a capacitive coupling is caused between the display panel and the touch panel. Using high drive pulse voltages for driving the detection electrodes of the touch panel, the noise causes an adverse effect on the display panel through the capacitive coupling.

In addition, the influence of the noise attributed to the capacitive coupling, etc. between the display panel and the touch panel which are superposed on each other or integrally formed reaches even the display panel to the touch panel. Activating the touch panel to perform a touch detection during a non-display drive term rather than a display drive term of the display panel in a cycle of a frame synchronizing signal of a display frame (also, hereinafter referred to as "frame" simply), the noise owing to a drive display action of the display panel, and the noise of a detection action of the touch panel can be prevented from affecting each other. Especially, in a case where the relation between the display and the non-display drive terms is fixed in a cycle of the frame synchronizing signal, the difference in brightness arises in a display frame at each boundary of display and non-display drive terms; the larger the number of times the display and non-display drive terms are repeated is, the more remarkable the degradation of display quality owing to the undesired brightness difference is. Further, the aging arises in display elements of the display line covering each boundary of the display and non-display drive terms, which leads to the change in light transmittance and appears to make a horizontal stripe in a display screen in e.g. an LC (liquid crystal) display device.

Such being the case, a display controller arranged so that the start timings of display and non-display drive terms in the cycle of the frame synchronizing signal of a display frame can be changed at intervals of one or a plurality of cycles of the frame synchronizing signal is adopted in the Japanese Unexamined Patent Application Publication No. JP-A-2014-146093, which controls a display panel so that the display action is performed in a display drive term and the touch detection action is conducted in a non-display drive term. According to this, the boundary of display and non-display drive terms is not fixed, and such boundaries are distributed over a whole display screen, whereby the display quality can be prevented from being degraded by the undesired brightness difference resulting from the iteration of display and non-display drive terms and further, the degradation of display quality owing to local degradation as a result of the aging at the boundaries distributed over the whole display screen can be prevented.

SUMMARY

Embodiments described herein include a drive control device which drives and controls a panel module having arrays of display elements and arrays of touch detection electrodes arranged therein. The drive control device includes a display control part which selects a display line out of the display element arrays and provides a display signal to the selected display line to perform display control in a display drive term. The drive control device also includes a touch control part which performs touch detection control by use of the touch detection electrodes in a non-display drive term, where the display control part includes a control circuit operable to control first and second frame modes, and a clock pulse generator operable to produce a display line clock signal in synchronization with a cycle of switching the display line. In the first frame mode, a non-display drive term and a display drive term are alternately created in a length of time between opposing blank terms of each display frame period multiple times, the touch control part accepts a direction for touch detection control in the non-display drive term, and the display control is performed in each display drive term. In the second frame mode, a non-display drive term and a display drive term subsequent thereto are produced in a length of time between opposing blank terms of each display frame period, the touch control part does not accept a direction for touch detection control in the non-display drive term, and the display control is performed in the display drive term. The control circuit changes the display drive term and the non-display drive term subsequent thereto to start timing on an individual display frame period basis for every plurality of display frame periods in the case of continuing the first frame mode.

The clock pulse generator outputs the display line clock signal of a first cycle in the first frame mode, and outputs the display line clock signal of a second cycle longer than the first cycle in the second frame mode.

In another embodiment, a system includes a panel module having arrays of display elements and arrays of touch detection electrodes arranged therein. The system also includes a drive control device operable to drive and control the panel module. The system also includes a host device operable to supply display data to the drive control device. The drive control device includes a display control part which selects a display line out of the display element arrays and provides a display signal to the selected display line to perform display control in a display drive term. The drive control device also includes a touch control part which performs touch detection control by use of the touch detection electrodes in a non-display drive term. The drive control device also includes a microprocessor which determines a touch or no touch based on signals obtained in the touch detection control by the touch control part. The display control part includes a clock pulse generator operable to produce a display line clock signal in synchronization with a cycle of switching the display line. The display control part also includes a control circuit operable to control first and second frame modes. In the first frame mode, a non-display drive term and a display drive term are alternately created in a length of time between opposing blank terms of each display frame period multiple times, the touch control part accepts a direction for touch detection control in the non-display drive term, and the display control is performed in each display drive term. In the second frame mode, a non-display drive term and a display drive term subsequent thereto are produced in a length of time between opposing blank terms of each display frame period, the touch control part does not accept a direction for touch detection control in the non-display drive term, and the display control is performed in the display drive term. The control circuit changes the display drive term and the non-display drive term subsequent thereto to start timing on an individual display frame period basis for every plurality of display frame periods in the case of continuing the first frame mode. The clock pulse generator outputs the display line clock signal of a first cycle in the first frame mode, and outputs the display line clock signal of a second cycle longer than the first cycle in the second frame mode.

INTRODUCTION

The display action and the touch detection action are not always at constant intervals. In the case that the state of no touch detection lasts for a fixed length of time, a step to decrease power consumption is taken by lowering the frequency of touch detection or suspending the touch detection action during a predetermined length of time. Taking this into account, the embodiments for changing the start timing of the display drive term and the start timing of the non-display drive term will be largely varied depending on whether the frequency of touch detection is lowered, or the touch detection action is kept suspended or not during the predetermined length of time. Now, there are some points to consider on this. First, in any of such changing embodiments, the change is performed with the timing in synchronization with an internal horizontal synchronizing signal, making a reference signal for the action. This is because the start timing of the display drive term and the start timing of the non-display drive term must be decided in units of the display line such as a scan line. Second, the speed of reading display data from a buffer memory must be made faster than the speed of writing display data supplied from outside in synchronization with a frame synchronizing signal and a horizontal synchronizing signal into the buffer memory. This is done to ensure a non-display drive term. In the case of lowering the frequency of touch detection or keeping suspending the touch detection action during the predetermined length of time, the non-display drive term has the significance of ensuring a length of time devoted to write of display data on the buffer memory in order to prevent the buffer memory, which suffers the data read at a speed faster than the writing speed, from being brought into a data empty state. Therefore, the start timings must be controlled so as not to cause the coincidence of the start timings of display and non-display drive terms which are repeated multiple times in each display frame period even among the cases of lowering the frequency of touch detection, keeping the touch detection action suspended during a predetermined length of time, and doing none of them.

Hence, embodiments herein describe the idea of changing, in cycle, an internal horizontal synchronizing signal depending on whether the frequency of touch detection is lowered, or the touch detection action is kept suspended or not during the predetermined length of time.

It is an object of the disclosure to simplify control for avoiding the coincidence of the start timings of display and non-display drive terms, which are repeated multiple times in each display frame period, between the cases of lowering the frequency of touch detection, or keeping the touch detection action suspended, and doing none of them, thereby totally simplifying the control of non-display and display drive terms in each display frame period, which a drive control device performs for the purpose of preventing display lines subjected to the degradation in display performance from being localized, or display lines with flicker arising thereon from being unevenly distributed in adopting the control arranged so that display and non-display drive terms are changed in start timing depending on the result of touch detection.

The above and other objects of the disclosure, and novel features thereof will become apparent from the description hereof and the accompanying diagrams.

Now, the representative embodiment of the disclosure will be briefly outlined below. The reference numerals or character strings in parentheses in the subsequent paragraphs, which are noted for reference to the diagrams, are examples for easier understanding.

[1] Change of a Display Line Clock Signal Cycle According to the Presence or Absence of a Touch Detection Action A drive control device (4) which drives and controls a panel module (PNL) having arrays of display elements (PXL) and arrays of touch detection electrodes (ECR) arranged therein includes: a display control part (8) which selects a display line out of the display element arrays and provides a display signal to the selected display line to perform display control in a display drive term (DSP); and a touch control part (6) which performs touch detection control by use of the touch detection electrodes in a non-display drive term (LHB). The display control part includes a control circuit (26) operable to control a first frame mode (FMode1) and a second frame mode (FMode2), and a clock pulse generator (28) operable to produce a display line clock signal (LCK) in synchronization with a cycle of switching the display line. In the first frame mode, a non-display drive term and a display drive term are alternately produced in a length of time between opposing blank terms (BCKP, FRTP, BLNK) of each display frame period (FLM) multiple times;

and the touch control part accepts a direction for touch detection control in the non-display drive term, and the display control is performed in each display drive term. In the second frame mode, a non-display drive term and a display drive term subsequent thereto are produced in a length of time between opposing blank terms of the display frame period, and the touch control part does not accepts a direction for touch detection control in the non-display drive term, and the display control is performed in the display drive term. The control circuit changes the display drive term and the non-display drive term subsequent thereto in start timing on an individual display frame period basis for every plurality of display frame periods in the case of continuing the first frame mode. The clock pulse generator outputs the display line clock signal (LCK) of a first cycle (Tmg1-1) in the first frame mode, and outputs the display line clock signal (LCK) of a second cycle (Tmg1-2) longer than the first cycle in the second frame mode.

According to this embodiment, the phenomenon of an undesired brightness difference appearing at a fixed location in a display frame owing to no display, and the phenomenon of occurrence of flicker attributed to such undesired brightness difference can be suppressed. This is because the display term and the non-display term are changed in start timing on an individual display frame period basis in the first frame mode. In the second frame mode, the cycle of the display line clock signal is made longer than that in the first frame mode, thereby avoiding separating the display flame period halfway. So, unlike the first frame mode where display drive terms are separated from each other by putting a non-display drive term therebetween, a boundary of display and non-display drive terms can be readily kept from being not coincident with another in position. This is because no display drive term is separated in the second frame mode. Thus, it is possible to prevent display lines subjected to the degradation in display performance from being localized, or display lines with flicker arising thereon from being unevenly distributed.

[2] Timing of Scan Line Select Clock Signal Change to Display Drive Signals, Which Remains Unchanged Regardless of the Display Line Clock Signal Cycle In the drive control device as described in [1], the display control part has a scan line drive circuit (20) operable to output scan line select clock signals (GCK1 to GCK4) for sequentially selecting the scan lines of the display elements to the panel module, and a signal line drive circuit (21) operable to supply display drive signals (S1 to Sk) to the display elements of the selected scan lines. The scan line drive circuit changes, in pulse, the scan line select clock signals in synchronization with the display line clock signal, and the signal line drive circuit changes the display drive signals in synchronization with the display line clock signal. The scan line drive circuit outputs the scan line select clock signals so that a first interval ("Tmg2"–"Tmg3", "Tmg2-1"–"Tmg3-1", "Tmg2-2"–"Tmg3-2") from a timing of output switching of display drive signals to scan line nonselect pulse change of the scan line select clock signals remains unchanged between a case where the cycle of the display line clock signal is the first cycle and a case where the cycle is the second cycle.

According to this embodiment, in any of the first and second frame modes, i.e. even if the clock cycle of the display line clock signal is changed according to the kind of the frame mode, the drive time of display elements driven by the display drive signals switched in line with the change in display line clock signal is defined to be a fixed time by the first interval and kept unchanged. Therefore, uneven display cannot be produced even with the display line clock signal of which the clock cycle is changed according to the kind of the frame mode.

[3] Timing control of display drive signals and scan line select clock signals based on the display line clock signal In the drive control device as described in [2], the first interval is a difference of a third interval (Tmg3, Tmg3-1, Tmg3-2) from a second interval (Tmg2, Tmg2-1, Tmg2-2). The scan line drive circuit changes the scan line select clock signals to scan line nonselect pulses with a timing when the second interval elapses from the pulse change of the display line clock signal. The signal line drive circuit switches the output of the display drive signals with a timing when the third interval elapses from the pulse change of the display line clock signal.

According to this embodiment, the first interval can be controlled on the basis of the display line clock signal readily.

[4] Specify First and Second Cycles By the Control Circuit

In the drive control device as described in [2], the control circuit issues directions for the first and second cycles to the clock pulse generator, issues a direction for the second interval to the scan line drive circuit, and issues a direction for the third interval to the signal line drive circuit.

According to this embodiment, the cycle of the display line clock signal can be readily controlled according to the frame mode control by the control circuit. In addition, the timing of changing the scan line select clock signals and the timing of display drive signals can be readily controlled based on the display line clock signal according to the frame mode control by the control circuit.

[5] Specify Cycles and Intervals According to Values Set on the Rewritable Register In the drive control device as described in [4], the control circuit has a clock control register (27) on which first control data (DT (Tmg1-1)) for specifying the first cycle, second control data (DT (Tmg1-2)) for specifying the second cycle, third control data (DT (Tmg2), DT (Tmg2-1), DT (Tmg2-2)) for specifying the second interval, and fourth control data (DT (Tmg3), DT (Tmg3-1), DT (Tmg3-2)) for specifying the third interval are rewritably set, and the control circuit issues directions for the first cycle, the second cycle, the second interval and the third interval based on the first to fourth control data set on the clock control register.

According to this embodiment, the first and second cycles, and the second and third intervals can be programmably set for the control. [6] The Setting of Clock Cycles and Intervals By the Microprocessor The drive control device as described in [5] further includes a microprocessor (7) operable to determine a touch or no touch based on signals obtained in touch detection control by the touch control part, and the microprocessor sets the first to fourth control data on the clock control register.

According to this embodiment, the first to fourth control data can be initially set by power-on reset processing or reset processing by the microprocessor. [7] Horizontal Synchronizing Signal Cycle that Enables the Avoidance of Buffer Memory Empty In the drive control device as described in [1], the display control part has a buffer memory (22) into which display data are written in synchronization with an external horizontal synchronizing signal of a cycle longer than the second cycle, and from which display data are read in synchronization with the display line clock signal. The first cycle is a cycle which can assure that an intermittent read action at a speed faster than a write speed in the display drive term never brings the buffer memory with display data written therein into an empty state during each display frame period in the first frame mode. The second cycle is a cycle which can assure that a successive read action at a speed faster than the write speed in the display drive term never brings the buffer memory with display data written therein into the empty state during each display frame period in the second frame mode.

According to this embodiment, the second cycle is adequate as long as it is a cycle slightly shorter than the external horizontal synchronizing signal.

[8] Control Arranged to Gradually Increase the First Display Term and Shorten the Last Display Term on an Individual Display Frame Period Basis In the drive control device as described in [1], the control circuit performs, as control for changing the display and non-display drive terms in start timing on an individual display frame period basis, control arranged to gradually increase the first display term by a predetermined length of time and shorten the last display term by the predetermined length of time in each display frame period.

According to this embodiment, the control for changing the display and non-display drive terms in start timing on an individual display frame period basis can be materialized readily.

[9] Start Timing Register for Holding Control Data, and Control Logic

In the drive control device as described in [1], the display control circuit has: a start timing register (32) for rewritably holding fifth control data (DT (FMode1_0) to DT (FMode1_$n$)) for defining the start timing of the display drive term and the start timing of the non-display drive term subsequent thereto on an individual display frame period basis for every plurality of display frame periods according to the first frame mode, and sixth control data (DT (FMode2)) for defining the start timing of the display drive term on an individual display frame period basis according to the second frame mode; and a control logic (33, 34 and 35) which selects the fifth or sixth control data from the start timing register and produces, based on the selected control data, control signals for the corresponding display and non-display drive terms in each display frame period according to the specified display mode. The drive control device further includes a microprocessor (7) operable to determine a touch or no touch based on signals obtained in the touch detection control by the touch control part, and the microprocessor specifies the display mode.

According to this embodiment, the start timings of display and non-display drive terms in each display frame period can be variously controlled according to the contents of the fifth and sixth control data stored in the start timing register and further, according to an embodiment for selecting control data depending on the specified display mode. In short, the start timings of display and non-display drive terms in each display frame period in the first frame mode can be controlled programmably.

[10] Setting the Start Timings By the Microprocessor

In the drive control device as described in [9], the microprocessor sets the fifth and sixth control data on the start timing register.

According to this embodiment, the fifth and sixth control data can be initially set by power-on reset processing or reset processing by the microprocessor.

[11] Sequentially Define Display and Non-Display Terms By Display Line Clock Numbers In the drive control device as described in [9], the fifth and sixth control data are data which define each of the start timing of each of the display and non-display drive terms by a clock cycle number of the display line clock signal.

According to this embodiment, the start timings of the display and non-display terms can be defined readily.

[12] Control Logic

In the drive control device as described in [11], the control logic has: a first control logic (33) which selects required data from among the fifth and sixth control data in each display frame period according to the display mode specified by the microprocessor; a second control logic (34) which counts up the cycle number of the display line clock signal in each display frame period and in parallel, produces status signals (DST) sequentially every time the count value reaches the start timing of each of the display and non-display drive terms in the display frame period, which the data selected by the first control logic define; and a third control logic (35) which receives the status signals and produces display control signals (CNT1 to CNT5) according to the received status signals. The touch control part receives the status signals, and produces touch control signals required for the touch detection action according to the received status signals.

According to this embodiment, the status signals showing terms of display and non-display corresponding to display and non-display terms are produced and therefore, required control signals can be readily produced by providing the status signals to the circuit which produces control signals required for display control, and control signals required for touch detection.

[13] First and Second Display Modes Directed By the Microprocessor

The drive control device as described in [1] further includes a microprocessor operable to determine a touch or no touch based on signals obtained in the touch detection control by the touch control part. The microprocessor notifies the display control part of a second display mode (DMode2) in which the plurality of display frame periods are handled as one unit subsequently to its reset processing, provided that the second display mode is arranged to execute the second frame mode in part of the plurality of display frame periods, and to execute the first frame mode in the last display frame period of the plurality of display frame periods. In addition, the microprocessor notifies the display control part of a first display mode (DMode1) in which the plurality of display frame periods are handled as one unit in the event of detection of a touch after notification of the second display mode, provided that the first display mode is arranged to continue the first frame mode. Further, the microprocessor notifies the display control part of the second display mode in case that a given length of time has elapsed with a touch remaining undetected since the notification of the first display mode.

According to this embodiment, the microprocessor selectively uses the first and second frame modes based on the presence or absence of a touch, or an elapsed time since detection of a touch, whereby an unnecessary process can be eliminated. In addition, the microprocessor can control it by specifying the display mode.

[14] Semiconductor Integrated Circuit

The drive control device as described in [13] is formed as a semiconductor integrated circuit on a semiconductor substrate.

This embodiment can contribute to the downsizing of the drive control device and the reduction in power consumption.

[15] Change of a Display Line Clock Signal Cycle According to the Presence or Absence of a Touch Detection Action A piece of electronic equipment (SYSTM) includes: a panel module (PNL) having arrays of display elements (PXL) and arrays of touch detection electrodes (ECR) arranged therein; a drive control device (4) operable to drive and control the panel module; and a host device (5) operable to supply display data to the drive control device. The drive control device includes: a display control part (8) which selects a display line out of the display element arrays and provides a display signal to the selected display line to perform display control in a display drive term (DSP); a touch control part (6) which performs touch detection control by use of the touch detection electrodes in a non-display drive term (LHB); and a microprocessor (7) which determines a touch or no touch based on signals obtained in the touch detection control by the touch control part. The display control part includes a control circuit (26) operable to control a first frame mode (FMode1) and a second frame mode (FMode2), and a clock pulse generator (28) operable to produce a display line clock signal in synchronization with a cycle of switching the display line. In the first frame mode, a non-display drive term and a display drive term are alternately created in a length of time between opposing blank terms (BCKP, FRNTP, BLNK) of each display frame period (FLM) multiple times; the touch control part accepts a direction for touch detection control in the non-display drive term, and the display control is performed in each display drive term. In the second frame mode, a non-display drive term and a display drive term subsequent thereto are produced in a length of time between opposing blank terms of each display frame period, and the touch control part does not accept a direction for touch detection control in the non-display drive term, and the display control is performed in the display drive term. The control circuit changes the display drive term and the non-display drive term subsequent thereto in start timing on an individual display frame period basis for every plurality of display frame periods in the case of continuing the first frame mode. The clock pulse generator outputs the display line clock signal (LCK) of a first cycle (Tmg1-1) in the first frame mode, and outputs the display line clock signal (LCK) of a second cycle (Tmg1-2) longer than the first cycle in the second frame mode.

According to this embodiment, the display and non-display terms are changed in start timing on an individual display frame period basis in the first frame mode. So, the phenomenon of an undesired brightness difference appearing at a fixed location in a display frame owing to no display, and the phenomenon of occurrence of flicker attributed to such undesired brightness difference can be suppressed. In the second frame mode, the cycle of the display line clock signal is made longer than that in the first frame mode, to prevent the display frame period from being divided halfway. So, unlike the first frame mode in which display drive terms are divided by putting a non-display drive term therebetween, the coincidence of the boundary of display and non-display drive term in location can be avoided readily. This is because in the second frame mode, display drive terms are not divided. Therefore, it is possible to prevent display lines subjected to the degradation in display performance from being localized, or display lines with flicker arising thereon from being unevenly distributed.

[16] Timing of Scan Line Select Clock Signal Change to Display Drive Signals, Which Remains Unchanged Regardless of the Display Line Clock Signal Cycle In the piece of electronic equipment as described in [15], the display control part has a scan line drive circuit (20) operable to output scan line select clock signals (GCK1 to GCK4) for sequentially selecting the scan lines of the display elements to the panel module, and a signal line drive circuit (21) operable to supply display drive signals to the display elements of the selected scan lines. The scan line drive circuit changes, in pulse, the scan line select clock signals in synchronization with the display line clock signal, and the signal line drive circuit changes the display drive signals in synchronization with the display line clock signal. The scan line drive circuit outputs the scan line select clock signals so that a first interval ("Tmg2"-"Tmg3", "Tmg2-1"-"Tmg3-1", "Tmg2-2"-"Tmg3-2") from a timing of output switching of display drive signals to scan line nonselect pulse change of the scan line select clock signals remains unchanged between a case where the cycle of the display line clock signal is the first cycle and a case where the cycle of the display line clock signal is the second cycle.

According to this embodiment, in any of the first and second frame modes, i.e. even if the clock cycle of the display line clock signal is changed according to the kind of the frame mode, the drive time of display elements driven by the display drive signals switched in line with the change in display line clock signal is defined to be a fixed time by the first interval and kept unchanged. Therefore, uneven display cannot be produced even with the display line clock signal of which the clock cycle is changed according to the kind of the frame mode.

[17] Timing Control of Display Drive Signals and Scan Line Select Clock Signals Based on the Display Line Clock Signal In the piece of electronic equipment as described in [16], the first interval is a difference of a third interval (Tmg3, Tmg3-1, Tmg3-2) from a second interval (Tmg2, Tmg2-1, Tmg2-2). The scan line drive circuit changes the scan line select clock signals to scan line nonselect pulses with a timing when the second interval elapses from the pulse change of the display line clock signal. The signal line drive circuit switches the output of the display drive signals with a timing when the third interval elapses from the pulse change of the display line clock signal.

According to this embodiment, the first interval can be controlled on the basis of the display line clock signal readily.

[18] Horizontal Synchronizing Signal Cycle That Enables the Avoidance of Buffer Memory Empty In the piece of electronic equipment as described in [17], the display control part has a buffer memory (22) into which display data are written in synchronization with an external horizontal synchronizing signal of a cycle longer than the second cycle, and from which display data are read in synchronization with the display line clock signal. The first cycle is a cycle which can assure that an intermittent read action at a speed faster than a write speed in the display drive term never brings the buffer memory with display data written therein into an empty state during each display frame period in the first frame mode. The second cycle is a cycle which can assure that a successive read action at a speed faster than the write speed in the display drive term never brings the buffer memory with display data written therein into the empty state during each display frame period in the second frame mode.

According to this embodiment, the second cycle is adequate as long as it is a cycle slightly shorter than the external horizontal synchronizing signal.

[19] Specify Cycles and Intervals According to Values Set on the Rewritable Register The piece of electronic equipment as described in [18] further includes a nonvolatile storage (9) in which first control data (DT (Tmg1-1)) for specifying the first cycle, second control data (DT (Tmg1-2)) for specifying the second cycle, third control data (DT (Tmg2), DT (Tmg2-1), DT (Tmg2-2)) for specifying the second interval, and fourth control data (DT (Tmg3), DT (Tmg3-1), DT (Tmg3-2)) for specifying the third interval are rewritably stored. The control circuit has a clock control register (27) on which the first to fourth control data transmitted from the nonvolatile storage are set rewritably, and issues directions for the first cycle, the second cycle, the second interval and the third interval based on the first to fourth control data set on the clock control register.

According to this embodiment, the first cycle, the second cycle, the second interval and the third interval can be set according to rewritable register set values.

[20] Initial Setting of Control Data from the Nonvolatile Storage to the Clock Control Register In the piece of electronic equipment as described in [19], the microprocessor sets the first to fourth control data from the nonvolatile storage on the clock control register.

According to this embodiment, the first to fourth control data can be initially set on the clock control register through the power-on reset processing or the like.

The effect which of the embodiments disclosed in the present application, the representative embodiment brings about will be briefly described below.

It is possible to simplify control for avoiding the coincidence of the start timings of display and non-display drive terms, which are repeated multiple times in each display frame period, between the cases of lowering the frequency of touch detection, or keeping the touch detection action suspended, and doing none of them, thereby totally simplifying the control of non-display and display drive terms in each display frame period, which a drive control device performs for the purpose of preventing display lines subjected to the degradation in display performance from being localized, or display lines with flicker arising thereon from being unevenly distributed in adopting the control arranged so that display and non-display drive terms are changed in start timing depending on the result of touch detection.

BRIEF DESCRIPTION OF THE DRAWINGS

FIG. 21 is an explanatory diagram showing, by example, another action flow according to the first display mode;

FIG. 22 is a timing chart showing, by example, the second interval Tmg2-1 of the scan line select clock signal GCK4, and the third interval Tmg3-1 of output switching of the display drive signal Si with the display line clock signal LCK of the first cycle Tmg1-1 in the first frame mode; and FIG. 23 is a timing chart showing, by example, the second interval Tmg2-2 of the scan line select clock signal GCK4, and the third interval Tmg3-2 of output switching of the display drive signal Si with the display line clock signal LCK of the second cycle Tmg1-2 in the second frame mode.

DETAILED DESCRIPTION

Figure 2:
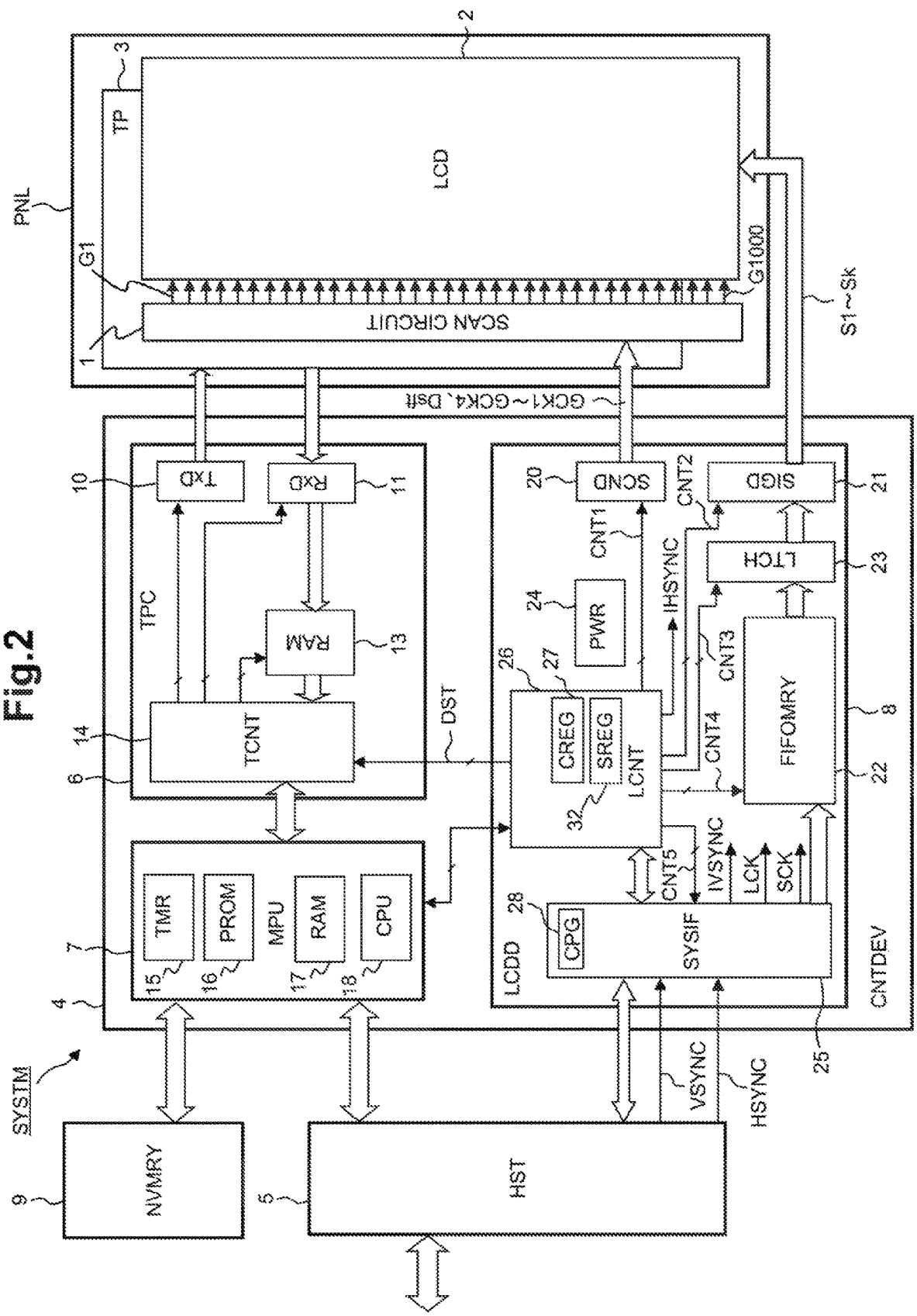
FIG. 2 is a block diagram showing an example of a piece of electronic equipment arranged by use of a drive control device.

Referring to FIG. 2, the drive control device 4 is shown by example, which is applied to a portable information terminal device, such as a tablet or smart phone, which is an example of the electronic equipment. The portable information terminal device SYSTM includes, on a surface of its casing, a panel module (PNL) having a display panel (LCD) 2, e.g. a dot matrix type liquid crystal display panel, and a touch panel (TP) 3 which enables the touch detection according to a mutual capacitance or self-capacitance method.

Figure 3:
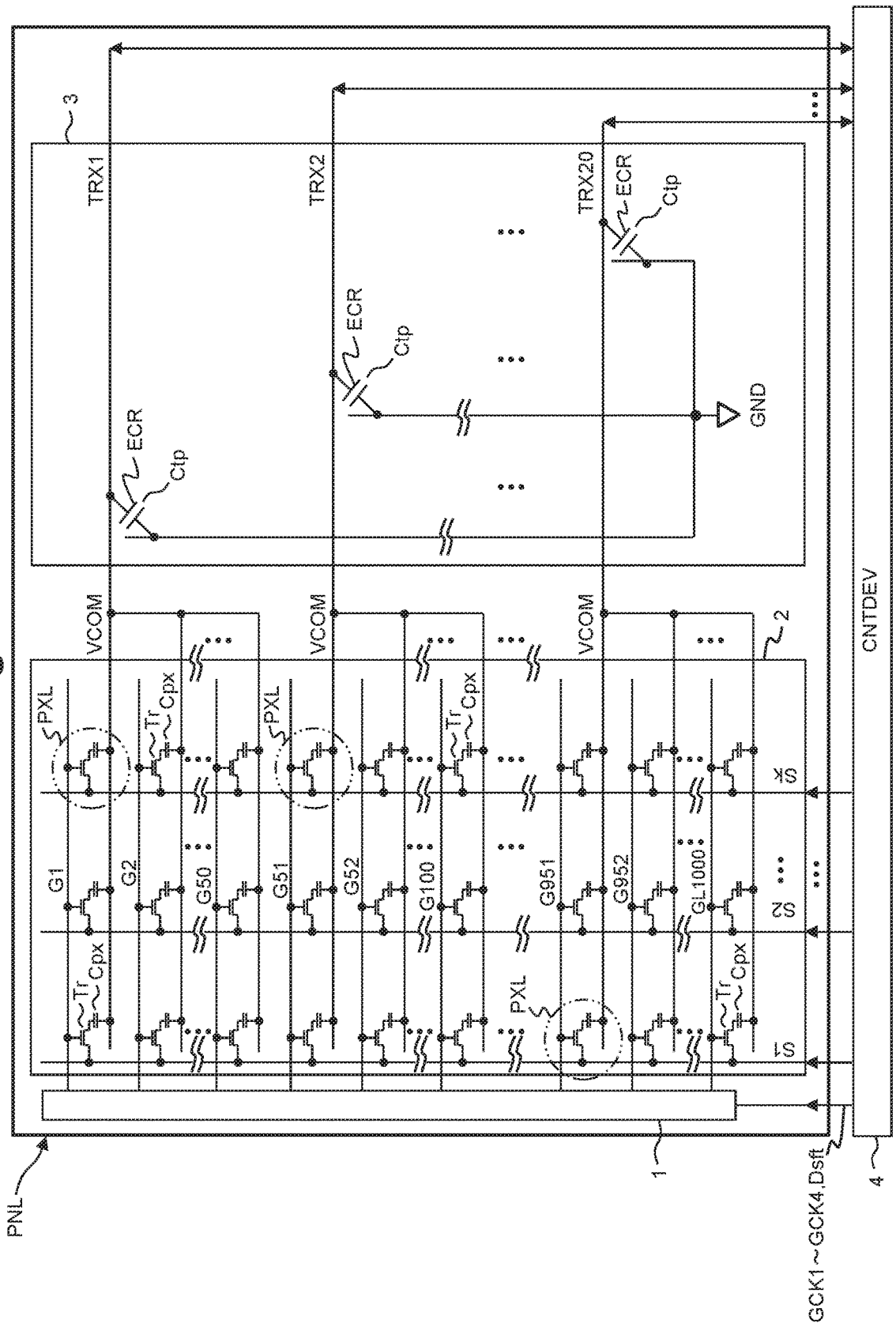
FIG. 3 is a circuit diagram schematically showing a panel module of a so-called in-cell form.

The panel module PNL is arranged in a so-called in-cell form in which a display panel 2 having a plurality of display elements PXL arranged like a matrix, and a touch panel 3 having touch detection electrodes ECR for constituting detection capacitances Ctp are integrally incorporated as shown in e.g. FIG. 3; the touch detection electrodes are arranged like a matrix at a density lower than that of the plurality of display elements PXL. The structure of the in-cell form has a TFT array substrate arranged by disposing TFTs and pixel electrodes for constituting display elements PXL on e.g. a glass board like a matrix, and it is formed by stacking, on the substrate, a liquid crystal layer, a common electrode layer opposed to the pixel electrodes, a color filter, a touch detection electrode for constituting a detection capacitance, a surface glass, etc. While the display panel 10 and the touch panel 11 are shown separately on the right and left sides for the sake of simplicity in FIG. 3, they are superposed on each other in reality.

While the display panel 2 is not particularly limited, it is arranged as follows. Referring to FIG. 3, in the display panel, a thin film transistor Tr termed TFT is disposed at each intersecting point of scan electrodes G1 to G1000 serving as gate lines, and signal electrodes S1 to Sk (k is a positive integer) which are arranged to cross each other; the scan electrodes G1 to G1000 are provided corresponding to gates of the thin film transistors Tr, and the signal electrodes S1 to Sk are provided corresponding to sources of the thin film transistors Tr; and a liquid crystal element and a storage capacitor, which make a sub-pixel, are formed between the drain of each thin film transistor Tr and a common electrode VCOM (in the diagram, the liquid crystal element and the storage capacitor are drawn by one capacitor Cpx on behalf of them), whereby respective display elements PXL are formed. Pixel lines running along the respective scan electrodes G1 to G1000 are referred to as "scan lines" or "display lines". In display control, the scan electrodes G1 to G1000 are driven sequentially; the thin film transistors Tr are turned ON in units of the scan electrode, and thus current is caused to flow between the source and drain of the thin film transistors in the ON state, during which respective signal voltages (gradation signals) applied to the sources through the corresponding signal electrodes S1 to Sk are applied to the respective liquid crystal elements Cpx. In this way, the state of the liquid crystal is controlled. The panel module PNL includes a scan circuit 1 which sequentially drives the scan electrodes G1 to G1000.

Although no special restriction is intended, the touch panel 3 of FIG. 3 is compliant with a self-capacitance type of electrostatic capacitance types, in which the touch detection electrodes ECR are arranged like a matrix. The touch detection electrodes ECR are connected to touch detection signal lines TRX1 to TRX20 respectively. The counter electrodes of the respective touch detection electrodes ECR form a stray capacitance and they are commonly connected to the ground terminal GND of the circuit. Although no special restriction is intended, the common electrode VCOM is divided into 20 parts in such a way that one part corresponds to 50 display lines in FIG. 3. Each part of the common electrode VCOM thus divided doubles as the corresponding touch detection signal line TRX1 to TRX20. In this way the panel module PNL is slimmed. For instance, the stray capacitance of the touch detection electrode ECR is charged through the touch detection signal lines TRX1 to TRX20. With a finger located near a touch detection electrode, the stray capacitance is increased. Then, the electric charge thus filled is re-distributed between the stray capacitance and a reference capacitance of a touch detection circuit. The detection about a touch or no touch can be performed according to the length of a discharge time of the re-distributed electric charge. Because of using the touch panel 3 superposed on the display panel 2, a touch operation can be determined from touch coordinates involved with the touch operation in the event of the touch operation performed on the touch panel 3 according to a screen display on the display panel 2.

As in FIG. 2, the drive control device 4 has: a display controller (LCDD) 8 as a display control part which performs display control of the display panel 2; a touch controller (TPC) 6 as a touch control part which performs touch detection control of the touch panel 3; and a microprocessor (MPU) 7 as an operation control part which performs operation control. The display controller 8 and the microprocessor 7 are interfaced with a host device (HST) 5. The host device 5 includes e.g. a host computer serving as its center, a communication circuit for mobile communication, near field communication or the like, and various peripheral devices. While the drive control device 4 is not particularly limited, it is materialized as of a semiconductor integrated circuit of a single chip, which is formed on a semiconductor substrate such as a single crystal silicon bulk according to a known CMOS integrated circuit manufacturing technique. Otherwise, it may be materialized as a multi-chip semiconductor module product or the like.

The touch panel controller 6 has e.g. a detection voltage output circuit (TxD) 10 which sequentially selects the touch detection signal lines TRX1 to TRX20 and charges the stray capacitance of the touch detection electrode ECR of the selected touch detection signal line, a detection circuit (RxD) 11 which accepts the input of an electric charge charged to the touch detection electrode ECR through the selected touch detection signal line, and detects the discharge time of the re-distributed electric charge after re-distribution of the electric charge between the stray capacitance and its reference capacitance, a RAM 13 for temporarily storing data of the detection time, and a touch control circuit (TCNT) 14. The touch control circuit 14 controls the select of the touch detection signal lines TRX1 to TRX20 by the detection voltage output circuit 10, and the output timing of a detection voltage and it controls, in synchronization therewith, the action timing of the detection circuit 11, and the write action on the RAM 13. After detection data of the discharge time for the touch detection electrodes ECR over the whole surface of the touch panel 3 have been accumulated in the RAM 13, the touch control circuit 14 passes the detection data to the microprocessor 7. The microprocessor 7 determines a touch or no touch based on the detection data, calculates coordinates of a touch position on the touch panel 2, and supplies the result of the calculation to the host device 5. On condition that the touch detection action in a non-display drive term is allowed by a status signal DST output by the display controller 8, the touch control circuit 14 enables the touch detection action which the touch control circuit 14 performs with the detection voltage output circuit 10 and the detection circuit 11.

Although no special restriction is intended on the microprocessor 7, a central processing unit (CPU) 18 executes programs stored in a rewritable nonvolatile memory (PROM) 16 in turn for data processing. The RAM 17 serves as a work region of the CPU 18. The microprocessor includes a timer counter (TMR) 15, which is representatively shown as a peripheral circuit of the CPU 18.

As in FIG. 2, the display controller 8 has e.g. a scan line select circuit (SCND) 20, a signal line drive circuit (SIGD) 21, an FIFO memory (FIFOMRY) 22 which is accessed according to a first-in, first-out method, a line latch circuit (LTCH) 23, a power supply circuit (PWR) 24, a host interface circuit (SYSIF) 25, and a display control circuit (LCNT) 26 serving as a control circuit which performs the total control of the display controller 8, and it performs the display control of the display panel 2, and directs the touch controller 6 to conduct a touch detection action in synchronization with internal synchronizing signals.

As the internal synchronizing signals, a reference clock signal SCK, a display line clock signal LCK, an internal frame synchronizing signal IVSYNC, and an internal horizontal synchronizing signal IHSYNC are shown by example in FIG. 2. While the host interface circuit 25 accepts the input of display data from the host device 5 in synchronization with the frame synchronizing signal VSYNC and the horizontal synchronizing signal HSYNC, it outputs the internal frame synchronizing signal IVSYNC in synchronization with the cycle of the frame synchronizing signal. In addition, the host interface circuit outputs the reference clock signal SCK making an oscillation clock signal of the clock pulse generator 28, and the display line clock signal LCK resulting from the frequency division thereof. The clock pulse generator 28 is operated to constantly oscillate in response to the power-on reset of the drive control device 4 and in parallel with this, the reference clock signal SCK and the display line clock signal LCK are also changed in clock constantly. The internal frame synchronizing signal IVSYNC serves to define a display frame cycle in an internal action of the display controller 8. The internal frame synchronizing signal IVSYNC has a cycle depending on a display frame period. Although no special restriction is intended, the internal frame synchronizing signal has a frequency of 60 Hz, and one cycle is 16 msec. The reference clock signal SCK is fixed in frequency. The display line clock signal LCK is a clock signal for synchronizing the cycle of display line switching, which serves as a reference clock signal of a display action. The display line clock signal LCK has a higher frequency than that of the horizontal synchronizing signal HSYNC supplied from outside the drive control device 4. While the detail is to be described later, the frequency is variable and specifically, its frequency division ratio to the reference clock signal SCK is made variable. The internal horizontal synchronizing signal IHSYNC is a clock signal which the display control circuit 26 outputs together with other control signals, and is changed in synchronization with the cycle of display line switching in a term during which the display lines are driven. The internal horizontal synchronizing signal has the same frequency as that of the display line clock signal LCK.

The host interface circuit 25 receives a display command and display data from the host device 5. The received display data are accumulated in the FIFO memory 22 one by one in order to absorb the difference between a display data supplying rate and a display action speed, and sequentially read out to catch up with the display timing and transmitted to the line latch circuit 23. The signal line drive circuit 21 outputs, in parallel, gradation voltages to the signal electrodes of the display panel 2 according to display data latched by the line latch circuit 23. In this embodiment, the FIFO memory 22 does not have a storage capacity enough to accumulate display data of one frame. The write of display data on the FIFO memory 22 is performed in synchronization with the frame synchronizing signal VSYNC and the horizontal synchronizing signal HSYNC, and the display data read is performed in synchronization with the display line clock signal LCK.

The scan line select circuit 20 outputs e.g. scan line select clock signals GCK1 to GCK4 and shift data Dsft to the scan circuit 1 of the panel module PNL in order to sequentially select scan lines of the display elements, i.e. the scan electrodes G1 to G1000. Although no special restriction is intended, the scan circuit 1 has a shift register for shifting the shift data Dsft from the first stage toward the final stage according to the change in the scan line select clock signals GCK1 to GCK4. The shift register has 1000 latch stages according to the number of the scan electrodes G1 to G1000. Each latch stage includes a master/slave latch circuit. The master/slave latch circuit accepts the input of scan line select clock signals GCK1 to GCK4, and performs a master/slave latch action; the output of the latch stage concerned is determined in synchronization with the change in the scan line select clock signal GCK4. That is, each latch stage sends latch data to the subsequent stage in synchronization with the change in the scan line select clock signal GCK4 during a predetermined length of time. An output of each latch stage is input to a gate driver, and the gate driver drives the corresponding scan electrode to a select level with an output according to the shift data Dsft. Thus, the thin film transistors are turned ON for each scan electrode. At this time, the signal line drive circuit 21 applies signal voltages to the display elements through the signal electrodes S1 to Sk for each horizontal scan period based on display data latched by the line latch circuit 23. Therefore, display driving of display elements is performed on an individual display line basis in synchronization with the scan driving of the scan electrodes in units of the frame cycle. The signal voltages (gradation voltages) output by the signal line drive circuit 21 and others are produced by the power supply circuit 24.

The display control circuit 26 performs the total control of the display controller 8, including the above display control based on a display command provided from the host device 5, and control data set on registers 27 and 28, and the direction to the touch controller 6. In the diagram, CNT1 represents a control signal to the scan line select circuit 20, CNT2 represents a drive control signal to the signal line drive circuit 21, CNT3 represents a latch control signal to the line latch circuit 23, CNT4 represents an access control signal to the FIFO memory 22, and CNT5 represents an input/output control signal to the host interface circuit 25 and a frequency control signal to the clock pulse generator 28.

First Frame Mode and Second Frame Mode

Figure 4:
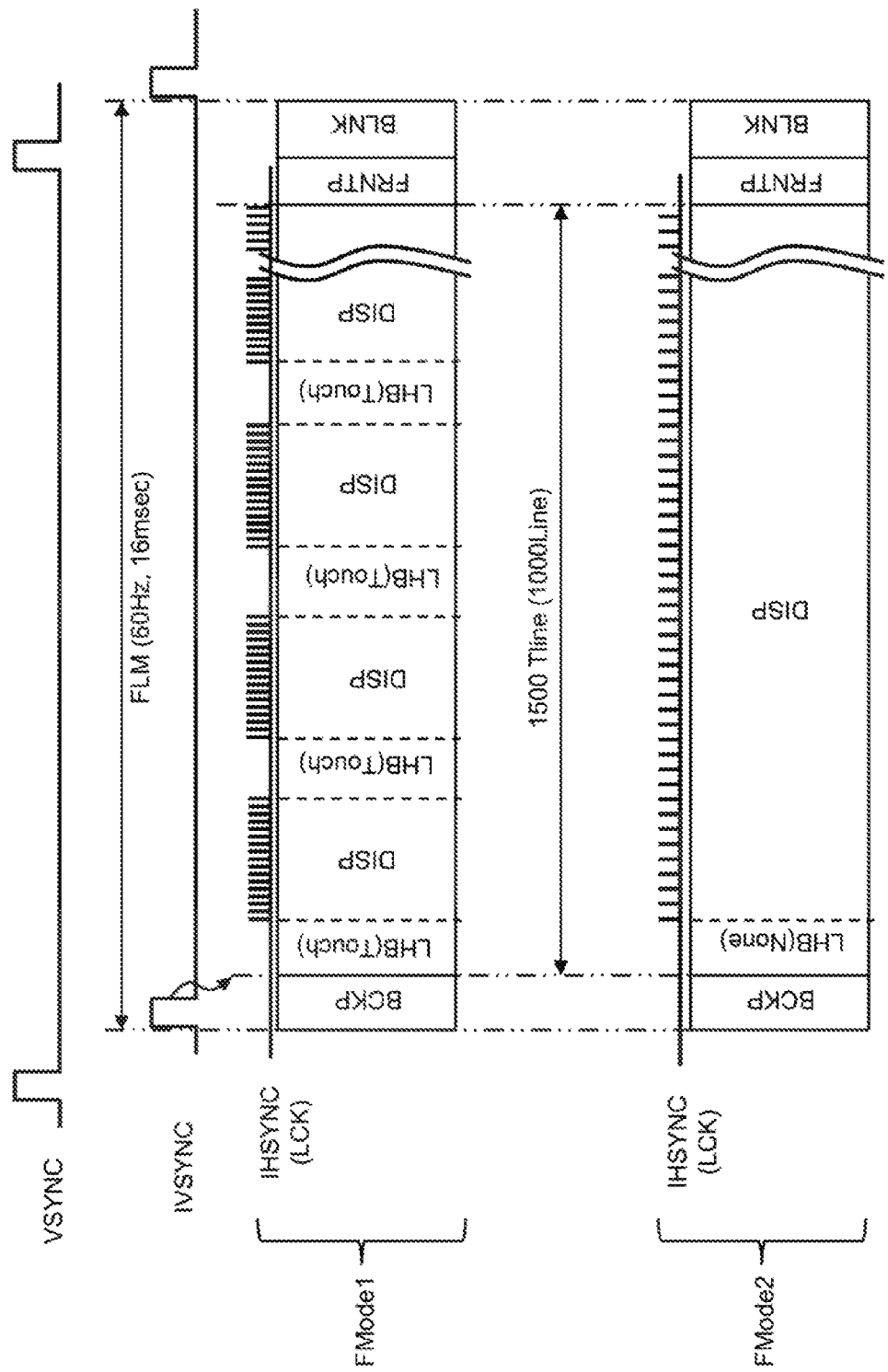
FIG. 4 is an explanatory diagram showing display and non-display drive terms in a frame display period in each of first and second frame modes.
Figure 13:
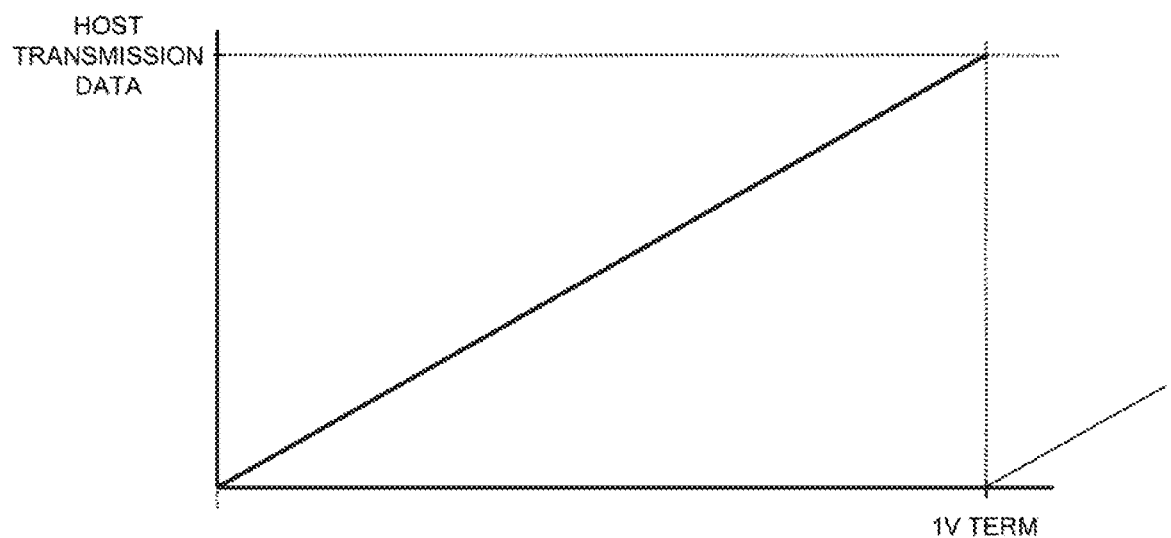
FIG. 13 is an explanatory diagram showing, by example, the action of sequentially writing display data into an FIFO memory in synchronization with an external horizontal synchronizing signal HSYNC with the passage of time.
Figure 14:
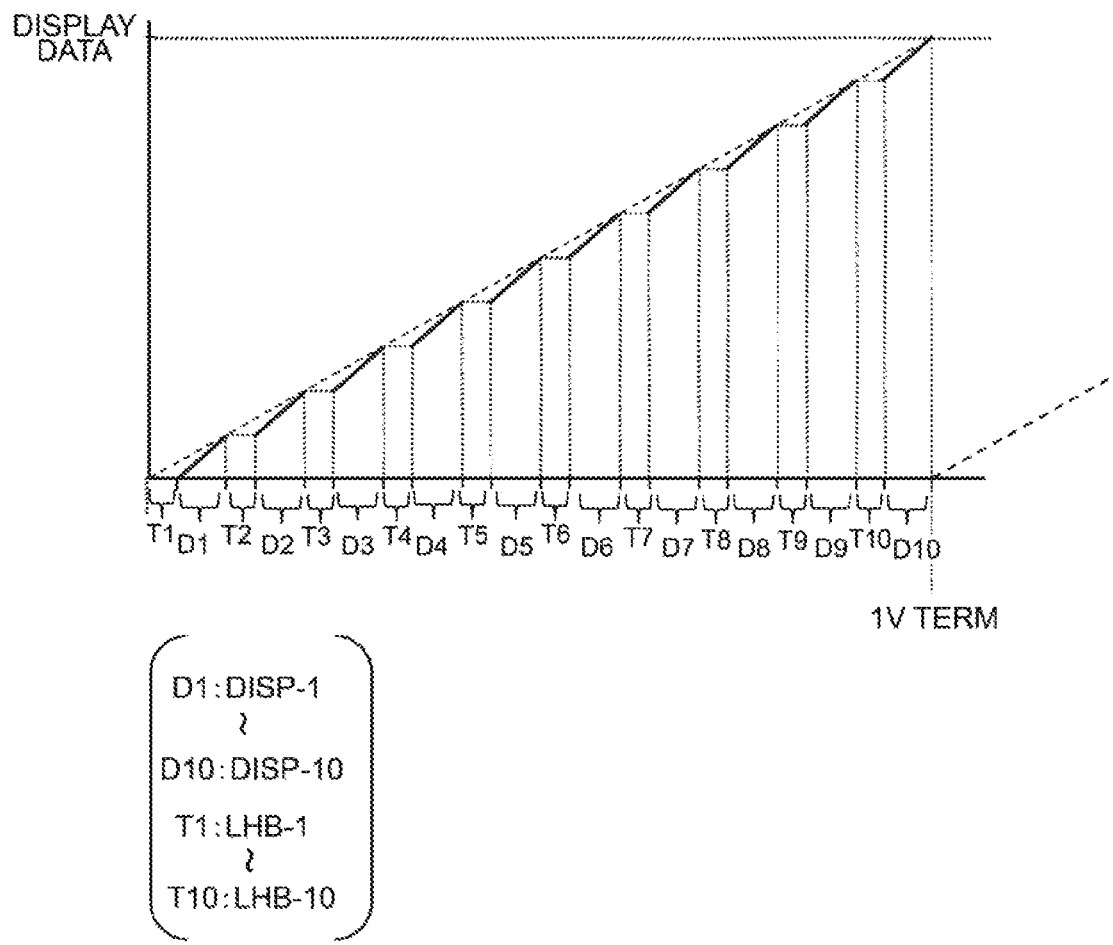
FIG. 14 is an action explanatory diagram showing, by example, the action of intermittently performing the read from the FIFO memory in the first frame mode at a higher speed than a write speed with the passage of time.

Further, the display control circuit 26 creates non-display drive terms LHB and display drive terms DISP in a length of time between blank terms at the beginning and end of a display frame period FLM, e.g. a back porch BCKP of the top, and a front porch FRTP and a blank BLNK at the end as shown in FIG. 4, by example. The display frame period FLM represents a length of time of one cycle of the internal frame synchronizing signal IVSYNC. The embodiments of creating the non-display drive term LHB and the display drive term DISP include two modes, a first frame mode FMode1 and a second frame mode FMode2. The first frame mode FMode1 is an action mode in which a non-display drive term LHB and a display drive term DISP are created alternately multiple times in a length of time between blank terms at the top and end of a display frame period FLM, and a direction for touch detection control is issued to the touch control part in the non-display drive term, and the display control is performed in every display drive term. As clear from the diagram, in the first frame mode FMode1, a plurality of non-display drive terms LHB are assigned to each display frame period FLM and as such, the internal horizontal synchronizing signal IHSYNC and the display line clock signal LCK are made higher, in frequency, than the external horizontal synchronizing signal HSYNC in the first frame mode unlike the second frame mode. Therefore, in the case of writing display data into the FIFO memory 22 in synchronization with the external horizontal synchronizing signal HSYNC (see FIG. 13), the read from the FIFO memory 22 must be performed accordingly at a higher speed in comparison to a speed for write thereinto in the first frame mode FMode1 (see FIG. 14).

Figure 15:
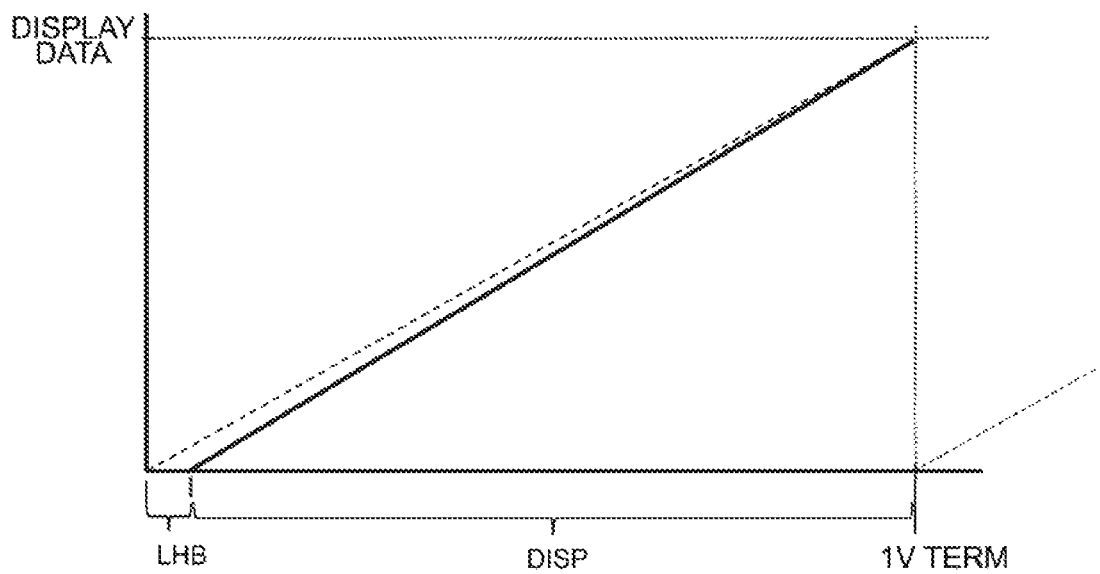
FIG. 15 is an action explanatory diagram showing, by example, the action of uninterruptedly performing the read from the FIFO memory in the second frame mode at a speed higher than the write speed with the passage of time.

The second frame mode FMode2 is an action mode in which a non-display drive term LHB and a display drive term DISP subsequent thereto are created in a length of time between the blank terms at the top and end of the display frame period FLM, and no direction for touch detection control is issued to the touch control part in the non-display drive term and the display control is performed in the display drive term. In the second frame mode FMode2, the non-display drive term LHB is just a slight length of time in the display frame period FLM and as such, it is adequate to make the internal horizontal synchronizing signal IHSYNC and the display line clock signal LCK slightly higher, in frequency, than the external horizontal synchronizing signal HSYNC. Therefore, in the case of writing display data into the FIFO memory 22 in synchronization with the external horizontal synchronizing signal HSYNC (see FIG. 13), it is adequate to perform the read from the FIFO memory 22 at a slightly higher speed in comparison to a speed for write thereinto in the second frame mode FMode2 (see FIG. 15).

Frequency of the Display Line Clock Signal LCK Varied According to the Frame Mode The display control circuit 26 controls the frequency of the display line clock signal LCK according to the frame mode. Specifically, the display control circuit 26 causes the clock pulse generator 28 to output a display line clock signal LCK of a first cycle Tmg1-1 (see FIG. 16) in the first frame mode FMode1, and it causes the clock pulse generator to output a display line clock signal LCK of a second cycle Tmg1-2 (see FIG. 17) which is longer than the first cycle Tmg1-1 in the second frame mode. Although no special restriction is intended, the frequency control on the internal horizontal synchronizing signal IHSYNC and the display line clock signal LCK can be realized by controlling the frequency division ratio for the reference clock signal SCK.

Figure 16:
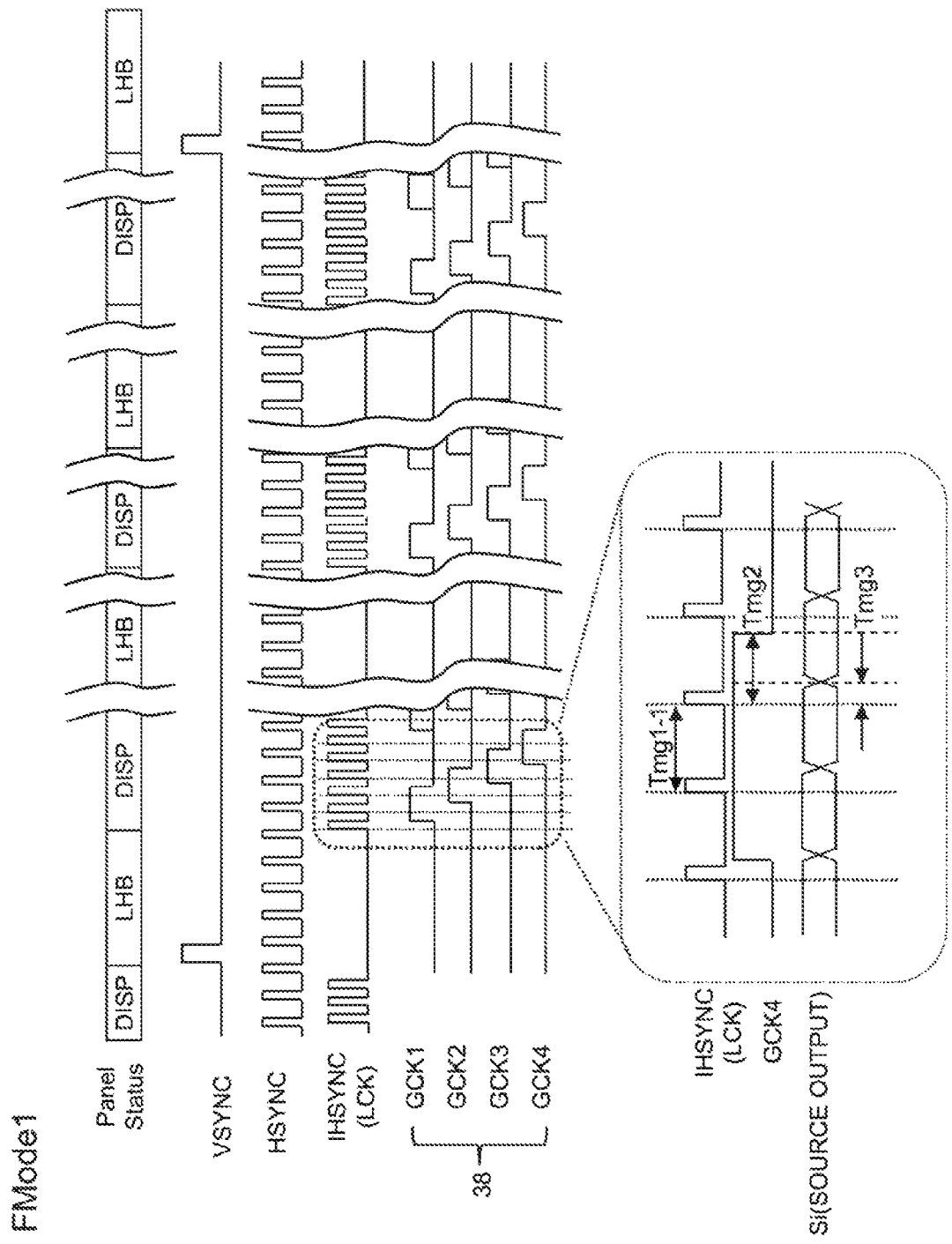
FIG. 16 is a timing chart showing, by example, a second interval Tmg2 of a scan line select clock signal GCK4, and a third interval Tmg3 of output switching of the display drive signal Si with the display line clock signal LCK of the first cycle Tmg1-1 in the first frame mode.
Figure 17:
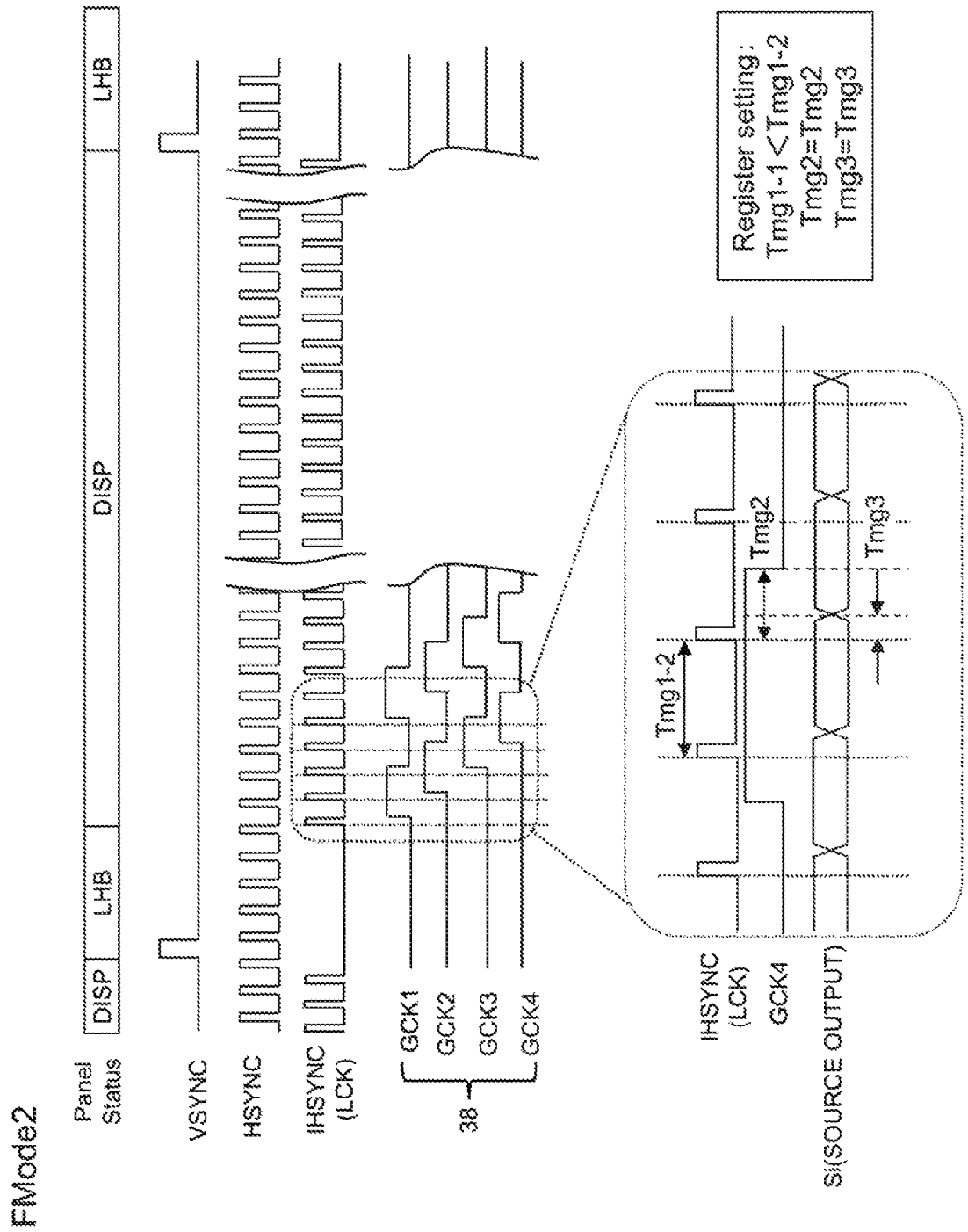
FIG. 17 is a timing chart showing, by example, the second interval Tmg2 of the scan line select clock signal GCK4, and the third interval Tmg3 of output switching of the display drive signal Si with the display line clock signal LCK of the second cycle Tmg1-2 in the second frame mode.

As described above, the scan line drive circuit 20 changes, in pulse, the scan line select clock signals GCK1 to GCK4 in synchronization with the display line clock signal LCK, and the signal line drive circuit 21 changes display drive signals S1 to Sk in synchronization with the display line clock signal LCK. That is, the output timing of signal voltages to the signal electrodes S1 to Sk, and the change timing of the scan line select clock signals GCK1 to GCK4 are synchronized to the clock change of the display line clock signal LCK. At this time, in any of the case of the display line clock signal LCK of which the cycle is the first cycle Tmg1-1 as shown in FIG. 16 by example, and the case of the display line clock signal of which the cycle is the second cycle Tmg1-2 as shown in FIG. 17 by example, the scan line drive circuit 20 produces the scan line select clock signal GCK4 in such a way that the first interval (Tmg2-Tmg3) from the time of switching the output of display drive signals S1 to Sk to the time of change of the scan line select clock signal GCK4 to a scan line non-selective pulse becomes equal. Specifically, as shown in FIGS. 16 and 17 by example, the first interval is defined as a difference of the third interval Tmg3 to the second interval Tmg2. Specifically, the scan line drive circuit 20 causes the scan line select clock signal GCK4 to change to the scan line non-selective pulse (causing the falling change thereof) in line with the timing when the second interval Tmg2 elapses from the pulse change of the display line clock signal LCK. The signal line drive circuit 21 switches the output of display drive signals in line with the timing when the third interval Tmg3 elapses from the pulse change of the display line clock signal LCK. The second interval Tmg2 and the third interval Tmg3 can be each controlled as a length of time from a rising pulse change of the display line clock signal LCK from which counting the number of changes of the reference clock signal SCK is started to the time when the resultant count value reaches a predetermined value.

In any of the first and second frame modes, or even if the display line clock signal LCK varies in clock cycle depending on the kind of the frame mode, the drive time of the display elements driven by the display drive signals switched in line with the change in display line clock signal is limited to a fixed time by the first interval and therefore, it remains unchanged. Supposing that the drive time of the display elements is varied depending on the frame mode, the electric charge accumulated in the display elements changes, in quantity, between the frame modes even with the same signal voltage, which results in uneven display, including color unevenness. Therefore, even with the display line clock signal of which the clock cycle is changed according to the kind of the frame mode, uneven display cannot be caused.

First Frame Mode in which the Start Timing of the Display Term is Varied Between Display Frames In the first frame mode FMode1, the start timings of a display drive term DISP and a non-display drive term LHB subsequent thereto are changed on an individual display frame period basis at intervals of a plurality of display frame periods. In the second frame mode FMode2, the display drive term DISP is not interrupted by the non-display drive term LHB in a display frame period FLM, or the non-display drive term LHB and display drive term DISP in a display frame period FLM are never changed in start timing for each display frame period.

Figure 5:
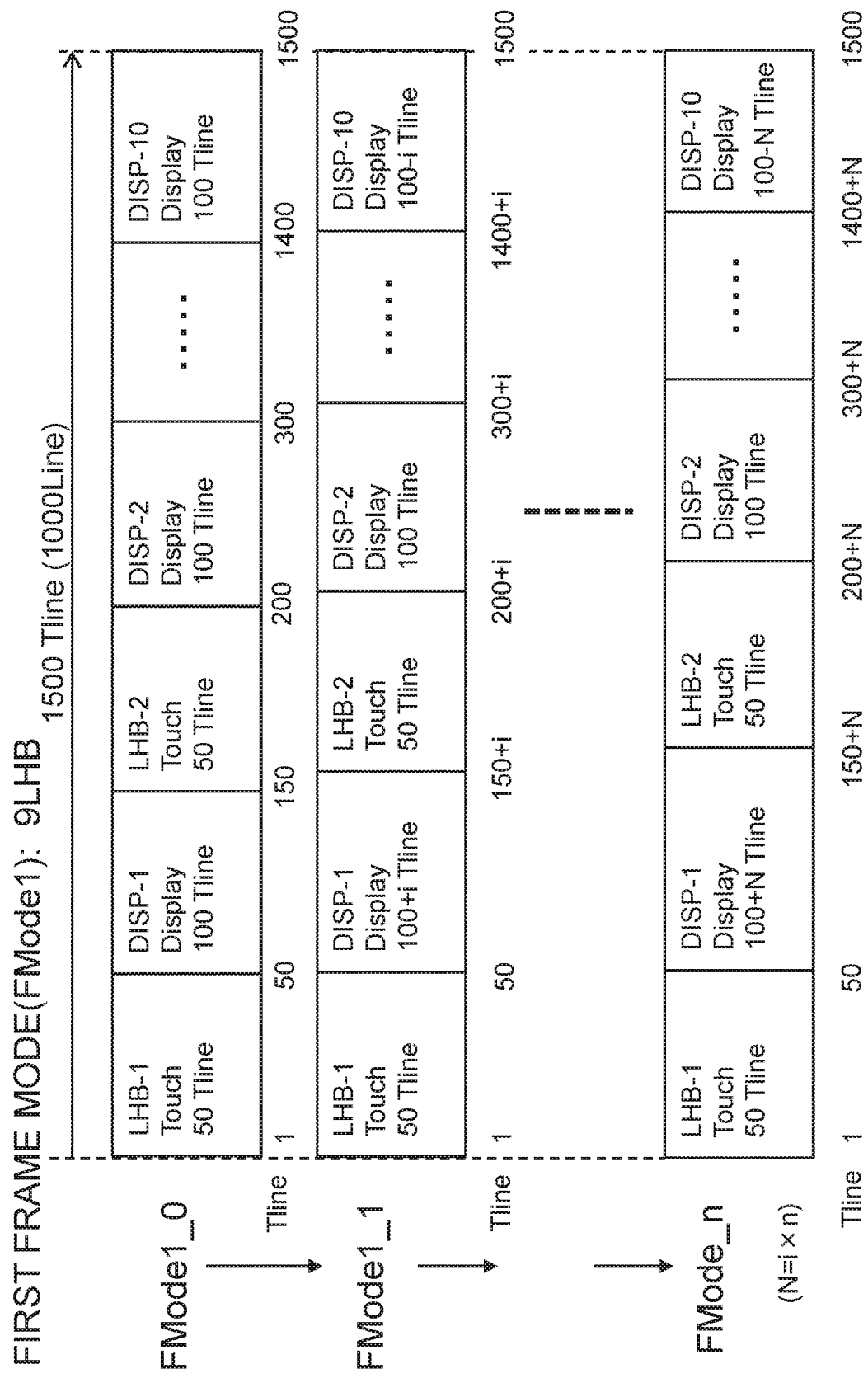
FIG. 5 is an explanatory diagram showing, by example, display and non-display drive terms according to control data of the first frame mode (FMode1)

FIG. 5 shows, by example, the embodiment of changing the start timings of the display drive term DISP and the non-display drive term LHB on an individual display frame period basis at intervals of a plurality of (n) display frame periods in the first frame mode FMode1. As to the FMode1_0, the bounds of the array of non-display drive terms LHB and display drive terms DISP in the first display frame period are each represented by a clock number Tline of display line clocks LCK, thereby showing the difference among the non-display and display drive terms in start timing. The suffixes attached to the display terms DISP and non-display terms LHB each represent the place of the term concerned in the array of the display and non-display terms; "Display" represents that the display action should be performed; and "Touch" represents that the touch detection action should be conducted. In this embodiment, the clock numbers Tline of the display drive terms DISP are almost 100, during which the display action is performed; and the clock numbers Tline of the non-display drive terms LHB are 50, during which the touch detection action is performed. The subsequent display frame period is shown in FMode1_1. The subsequent display frame period of FMode1_1 is different from FMode1_0 in that the clock number Tline of the first display drive term DISP-1 is increased to 100+i, and the clock number Tline of the last display drive term DISP-10 is decreased to 100−i. The last n+1-th display frame period is shown in FMode1_*n*. The last display frame period in FMode1_*n* is different from that in FMode1_0 in that the clock number Tline of the first display drive term DISP-1 is increased to 100+N (N=i×n), and the clock number Tline of the last display drive term DISP-10 is decreased to 100−N. With the first frame mode FMode1, in the action forms FMode1_0 to FMode1_*n* of the display frame periods as described above, the display drive terms DISP and non-display drive terms LHB are shifted in start timing by the clock number "1" (Tline); in each form, 10 display drive terms DISP and 9 non-display drive terms LHB are involved, and its last timing is fixed and kept at 1500 Tline. Although no special restriction is intended, in each action form FMode1_0 to FMode1_*n* of the first frame mode FMode1, the touch detection action by use of the non-display drive term LHB is performed in such a way that the touch panel 3 is subjected to the full-screen scanning once. Therefore, the touch determination including touch coordinate calculations based on the detection action of the full-screen scanning of the touch panel can be performed at intervals of 16 msec of the display frame period. Now, it is noted that the characters "i" and "n" each represent an appropriate integer, and i×n is preferably smaller than the number of display lines of one display drive term DISP.

Figure 6:
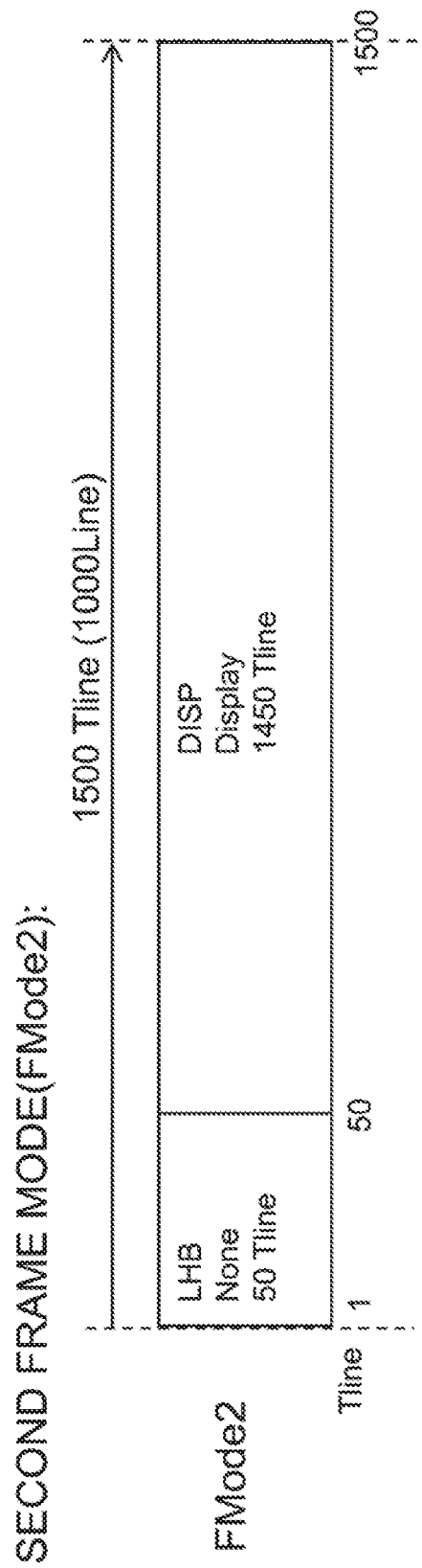
FIG. 6 is an explanatory diagram showing, by example, display and non-display drive terms according to control data of the second frame mode (FMode2)

FIG. 6 shows, by example, the arrangement of the display drive term DISP and the non-display drive term LHB in a display frame period FLM in the second frame mode FMode2. In the same way in FIG. 5, the bound of the display drive term DISP and the non-display drive term LHB is represented by a clock number Tline of display line clocks LCK; "Display" represents that the display action should be performed; and "None" represents that the touch detection action should be suppressed. In this embodiment, the clock number Tline of the display drive term DISP is 1450, during which the display action is performed; and the clock number Tline of the non-display drive term LHB is 50, during which the touch detection action is not performed.

As clear from FIG. 5, in the first frame mode FMode1, the boundaries of display drive terms DISP and non-display drive terms LHB are changed for every plurality of display frame periods FLM and as such, the flicker is prevented from arising on the display screen. In the second frame mode FMode2, one display drive term DISP is involved in a display frame period; the display drive term DISP is not interrupted by the non-display drive term halfway and as such, no flicker arises on its display screen in the display drive period to begin with. And, control arranged in consideration of preventing the start timing of the display drive term of the first frame mode FMode1, which are sequentially changed among the plurality of display frames never from being coincident with the start timing of the display drive term of the second frame mode FMode2 is not needed at all. So, the control of the frame mode is simplified totally.

First Display Mode and Second Display Mode

As clear from the description presented in reference to FIGS. 5 and 6, in the first frame mode FMode1 the display action is performed in a display drive term DISP, and the touch detection action is performed in a non-display drive term LHB. In contrast, with the second frame mode FMode2, the display action is performed in a display drive term DISP, whereas the touch detection action is not conducted in a non-display drive term LHB. Therefore, just using the second frame mode for lowering the power consumption with a low frequency of touch detection, the determination on the presence or absence of an additional touch cannot be performed to return back to the first frame mode FMode1. In such a case, it becomes necessary to mix the second frame mode in the first frame mode at a rate of once in multiple times of frame periods. Hence, the microprocessor 7 is arranged to cause the display control circuit 26 to change the way to use control data of the first frame mode FMode1 and control data of the second frame mode FMode2 based on the result of touch detection by the touch controller 6. Although no special restriction is intended, the embodiments of the way to use control data of the first frame mode FMode1 and control data of the second frame mode FMode2 include two kinds, i.e. a first display mode DMode1 and a second display mode DMode2.

Figure 9:
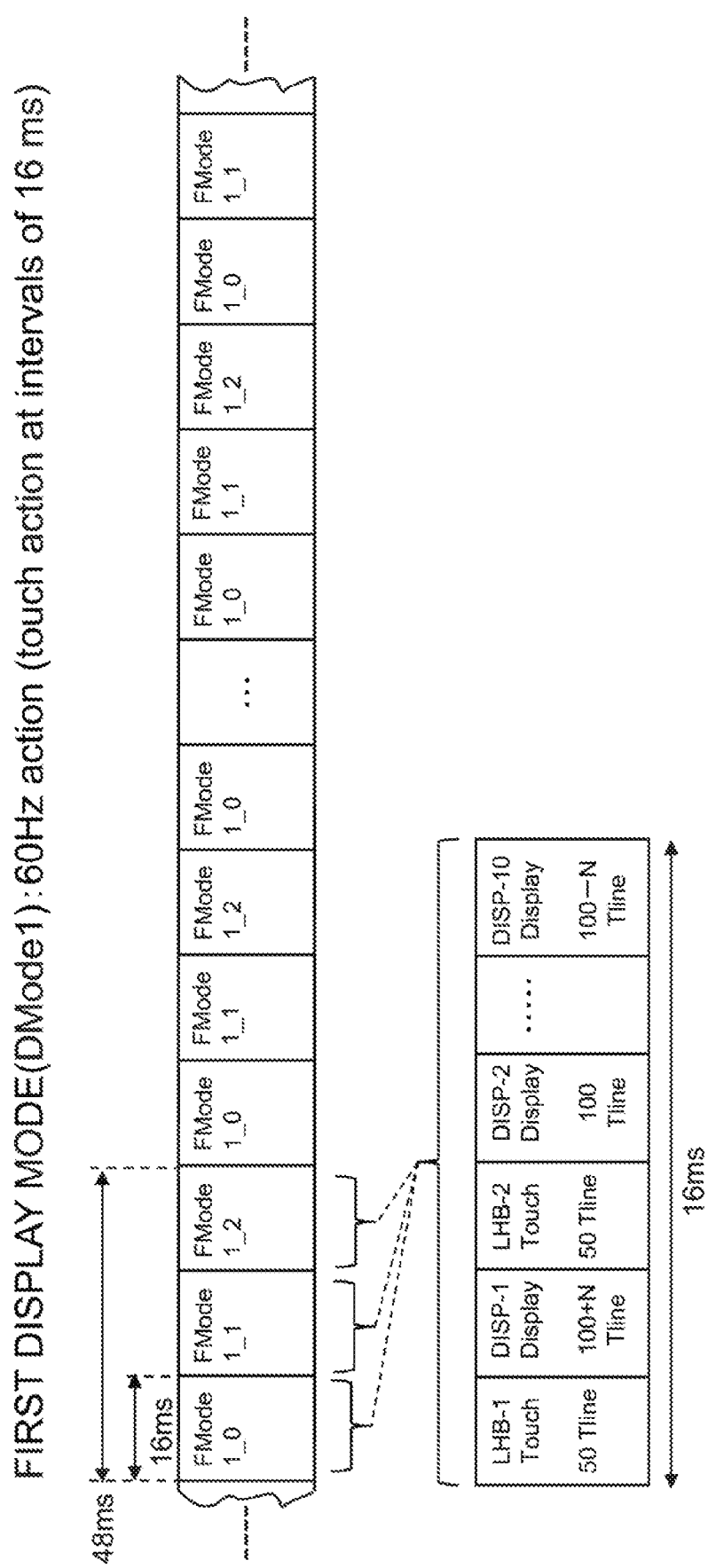
FIG. 9 is an explanatory diagram showing, by example, an action flow according to the first display mode in detail.

FIG. 9 shows, by example, the form of utilizing the frame modes FMode1 and FMode2 on condition that the first display mode DMode1 is specified. The first display mode DMode1 is an action mode arranged to continue the first frame mode FMode1, provided that the plurality of display frame periods FLM are handled as one unit in the first frame mode. In the example of FIG. 9, the first frame modes are in succession; in each first frame mode, a series of three action forms FMode1_0, FMode1_1 and FMode1_2 when that n=2 in the example of FIG. 5 make one unit. In the first display mode DMode1, the display action is performed in a display drive term DISP, and the touch detection action is repeated in a non-display drive term LHB for each frame. Specifically, the touch determination including touch coordinate calculations based on the touch detection can be performed in each display frame period at intervals of 16 msec.

Figure 8:
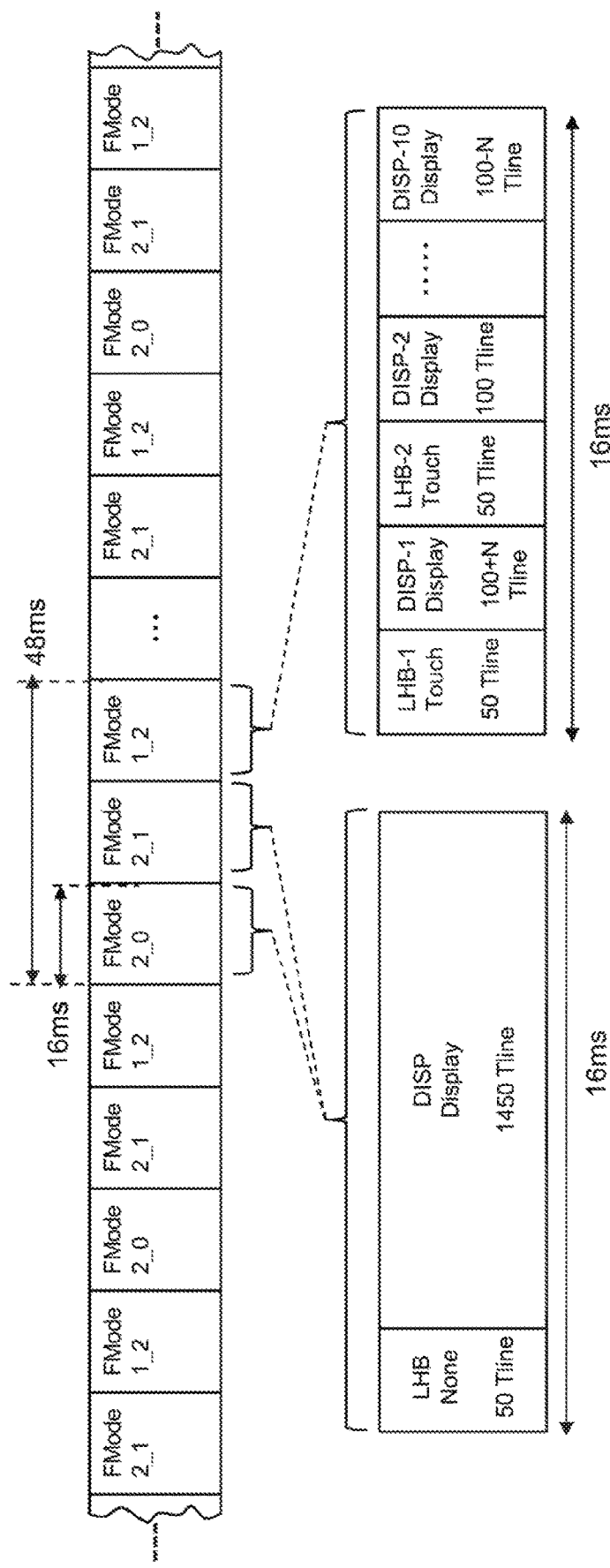
FIG. 8 is an explanatory diagram showing, by example, an action flow according to the second display mode in detail.

FIG. 8 shows, by example, the form of utilizing the frame mode on condition that the second display mode DMode2 is specified. The second display mode DMode2 is an action mode arranged to repeat the action of: executing the second frame mode FMode2 in which the plurality of display frame periods FLM form one unit in part of the plurality of display frame periods, and executing the first frame mode FMode1 in the last display frame period which is the only one display frame period. In the example of FIG. 8, the action in which a second frame mode corresponding to two action forms FMode2_0 and FMode2_1 in FIG. 6, and a first frame mode corresponding to the last action form FMode1_2 when n=2 in FIG. 5 are handled in combination as one unit is repeated. In the second display mode DMode2, the touch detection action is performed by using the non-display drive term LHB at a rate of one in three display frame periods FLM. That is, the touch determination including touch coordinate calculations based on touch detection at intervals of 48 msec representing display frame periods of three frames can be performed. Therefore, the second display mode DMode2 low in power consumption can be returned back to the first display mode DMode1 as required, which is assured.

Concrete Control Forms of the Display Mode and the Frame Mode

Figure 1:
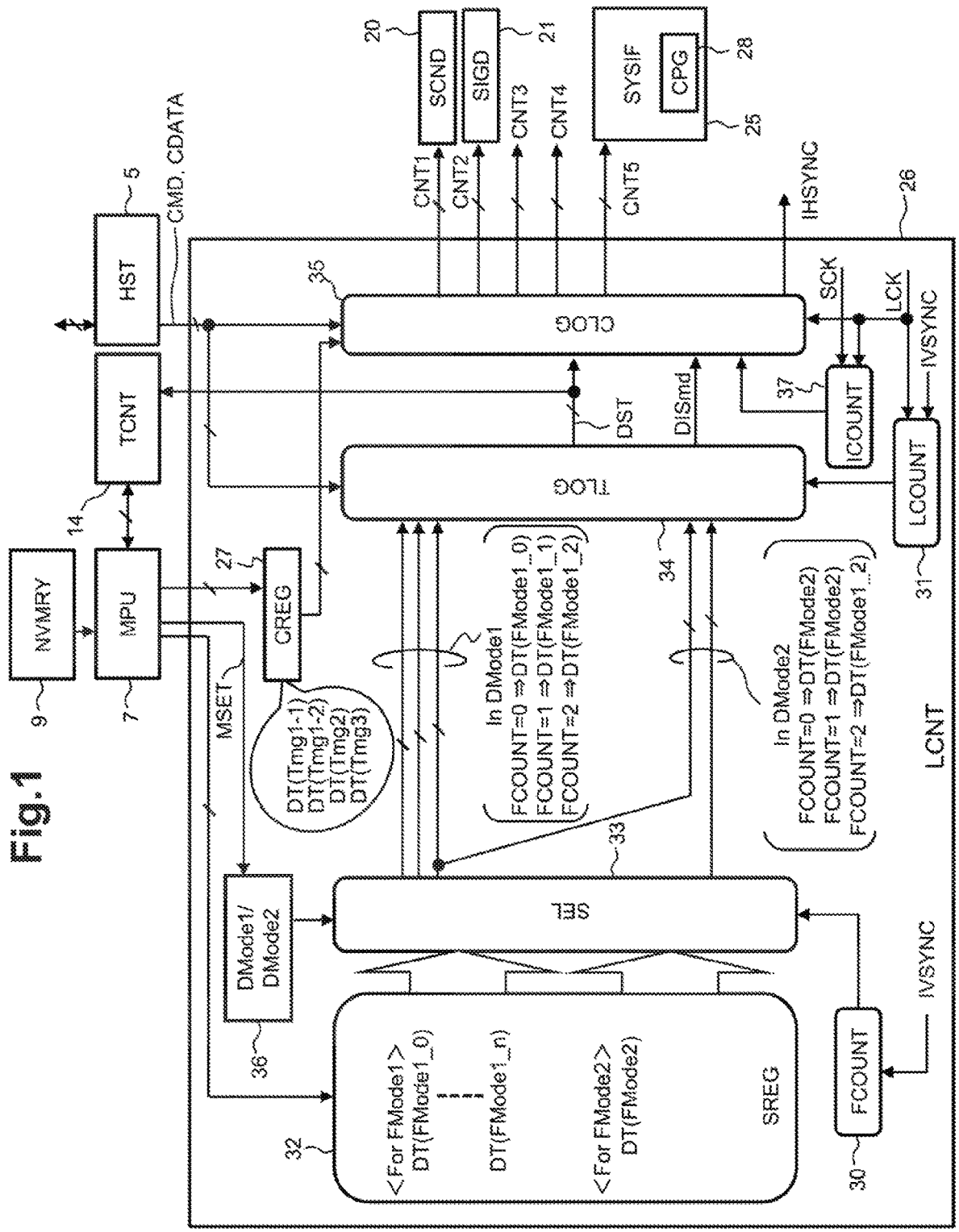
FIG. 1 is a block diagram showing an example of a display control circuit in a display controller.

Referring to FIG. 1, an embodiment of the display control circuit 26 supporting the first and second display modes is shown. The display control circuit 26 has: a frame counter (FCOUNT) 30; a line counter (LCOUNT) 31; an interval counter (ICOUNT) 37; a start timing register (SREG) 32; a first control logic (SEL) 33; a second control logic (TLOG) 34; a third control logic (CLOG) 35; a display mode register 36; and a clock control register (CREG) 27.

A plurality of sets of fifth control data DT (FMode1_0) to DT (FMode1_*n*) as control data of the first frame mode FMode1, and sixth control data DT (FMode2) as control data of the second frame mode FMode2 are rewritably set on the start timing register 32. The nonvolatile memory 9 holds the plurality of sets of fifth control data DT (FMode1_0) to DT (FMode1_*n*), and the sixth control data DT (FMode2) on the system. On the system reset or in power-on reset processing, the microprocessor 7 takes the plurality of sets of fifth control data DT (FMode1_0) to DT (FMode1_*n*), and the sixth control data DT (FMode2) from the nonvolatile memory 9 and initially sets them on the start timing register 32.

The following are rewritably set on the clock control register 27: the first control data DT (Tmg1-1) for specifying the first cycle Tmg1-1; the second control data DT (Tmg1-2) for specifying the second cycle Tmg1-2; the third control data DT (Tmg2) for specifying the second interval Tmg2; and the fourth control data DT (Tmg3) for specifying the third interval Tmg3. The first to fourth control data DT (Tmg1-1), DT (Tmg1-2), DT (Tmg2) and DT (Tmg3) are held by the nonvolatile memory 9 on the system. On the system reset or in power-on reset processing, the microprocessor 7 takes the first to fourth control data DT (Tmg1-1), DT (Tmg1-2), DT (Tmg2) and DT (Tmg3) from the nonvolatile memory 9 and initially sets them on the start timing register 32.

Although no special restriction is intended, the first control data DT (Tmg1-1) and the second control data DT (Tmg1-2) are frequency division number data of the reference clock signal SCK. Although no special restriction is intended, the third control data DT (Tmg2) and the fourth control data DT (Tmg3), each specifying the intervals, are count value data to be compared with a count value of the reference clock signal counted by the interval counter 37.

The fifth control data DT (FMode1_0) to DT (FMode1_*n*) are data of the action forms FMode1_0 to FMode1_*n* respectively, which define, on an individual display frame period basis, the start timing of the display drive term DISP and the start timing of the non-display drive term LHB in a plurality of display frame periods according to the first frame mode FMode1. As described with reference to FIG. 5, the fifth control data include data showing a term number, either Display action (Display) or Touch detection (Touch), and the number of clocks of the term represented by Tline for each of the display drive period and non-display drive term LHB in each action form FMode1_0 to FMode1_*n*.

The sixth control data DT (FMode2) are data which define the start timing of the display drive term DISP on an individual display frame period basis in a plurality of display frame periods according to the second frame mode FMode2. As described with reference to FIG. 6, the sixth control data include data showing a term number of the display drive term, either Display action (display) or Touch detection suppressed (None), and the number of clocks of the term represented by Tline in the action form FMode2.

Figure 7:
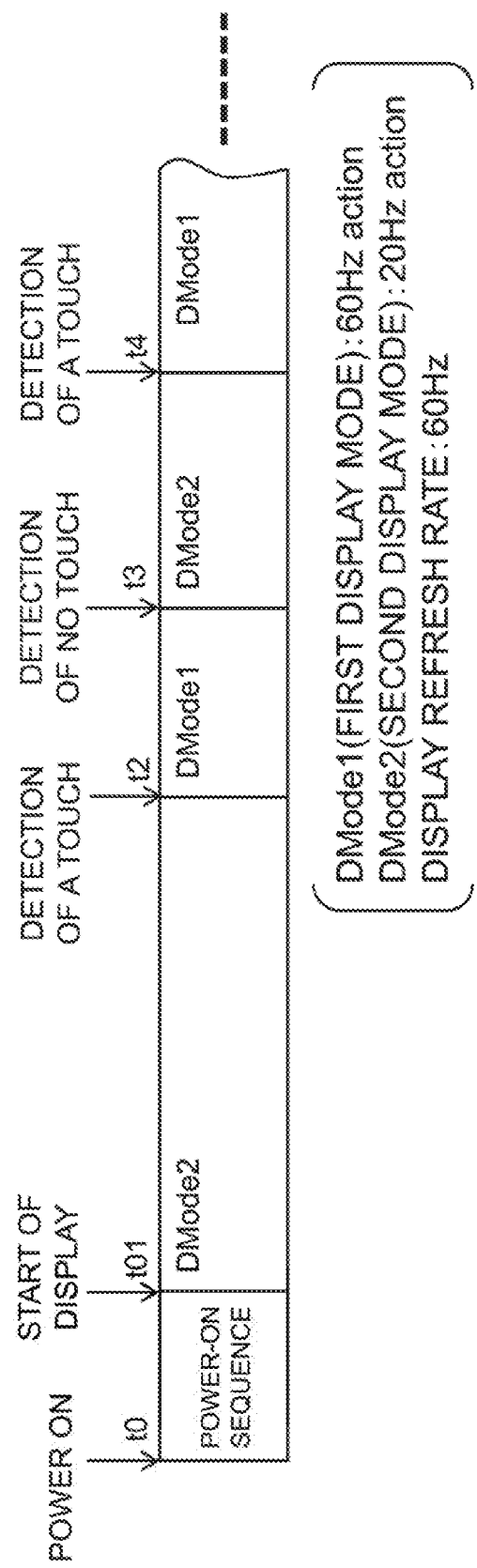
FIG. 7 is an explanatory diagram showing, by example, a whole action flow of the drive control device according to the first display mode (DMode1) and the second display mode (DMode2)
Figure 10:
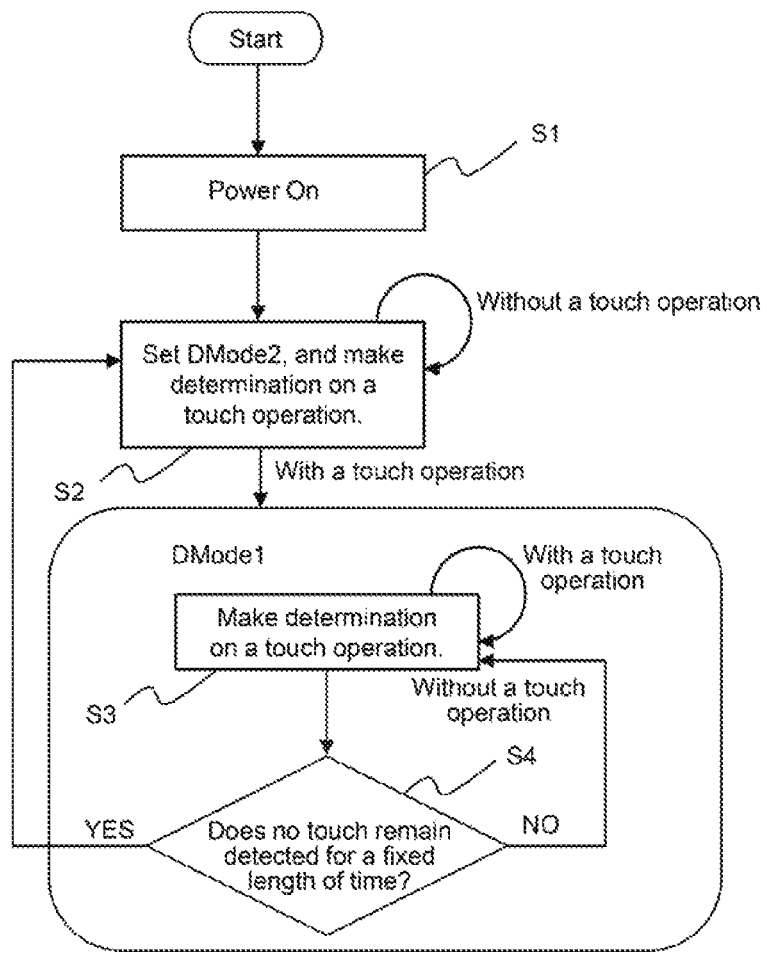
FIG. 10 is a control flow chart showing an action of the microprocessor selecting the first display mode or the second display mode.

On the mode register 36, the microprocessor 7 uses a mode-set signal MSET to variably set display mode data of the first display mode DMode1 or second display mode DMode2. The action of setting such mode data by the microprocessor 7 is performed based on a control flow exemplified in FIG. 10. Specifically, after power-on (S1), the display mode is made the second display mode DMode2 first, and whether or not a touch operation is performed is determined at a frequency specified according to the mode. The display mode is continued until a touch operation is determined to be performed (S2). After it has been determined that a touch operation is performed, the display mode is changed to the first display mode DMode1, and whether a touch operation has been performed or not is determined by the touch detection action for each display frame (S3). The microprocessor 7 starts the timer counter 15 in response to the change to the first display mode. If a touch operation is determined before a fixed period of time elapses, when the timer counter times out, the timer counter 15 is reset to perform the timer action again from the beginning. In contrast, if a touch operation has not been determined until the fixed period of time elapses, the display mode is changed to the second display mode DMode2 in response to the timeout of the timer counter 15. After that, the same control action is repeated. The action flow materialized by the above control flow is as shown in e.g. FIG. 7.

The first control logic 33 selects required sets of data from among the plurality of sets of fifth control data DT (FMode1_0) to DT (FMode1_*n*), and the second control data DT (FMode2) according to the display mode set on the mode register 36, and a count value of the frame counter 30 in each display frame period. For instance, it is supposed for easier understanding that n=2 according to the embodiment described with reference to FIGS. 8 and 9, and the frame counter 30 counts up internal frame synchronizing signals IVSYNC from the initial value, 0 to 2 according to the wrap around manner. In this case, in the first display mode DMode1, the first control logic 33 selects the control data DT (FMode1_0) of the first frame mode FMode1 when FCOUNT=0, selects the control data DT (FMode1_1) of the first frame mode FMode1 when FCOUNT=1, and selects the control data DT (FMode1_2) of the first frame mode FMode1 when FCOUNT=2. This select form corresponds to that shown in FIG. 9. In the second display mode DMode2, the first control logic 33 selects the control data DT (FMode2_0) of the second frame mode FMode2 when FCOUNT=0, selects the control data DT (FMode2_1) of the second frame mode FMode2 when FCOUNT=1, and selects the control data DT (FMode1_2) of the first frame mode FMode1 when FCOUNT=2. This select form corresponds to that shown in FIG. 8.

Figure 11:
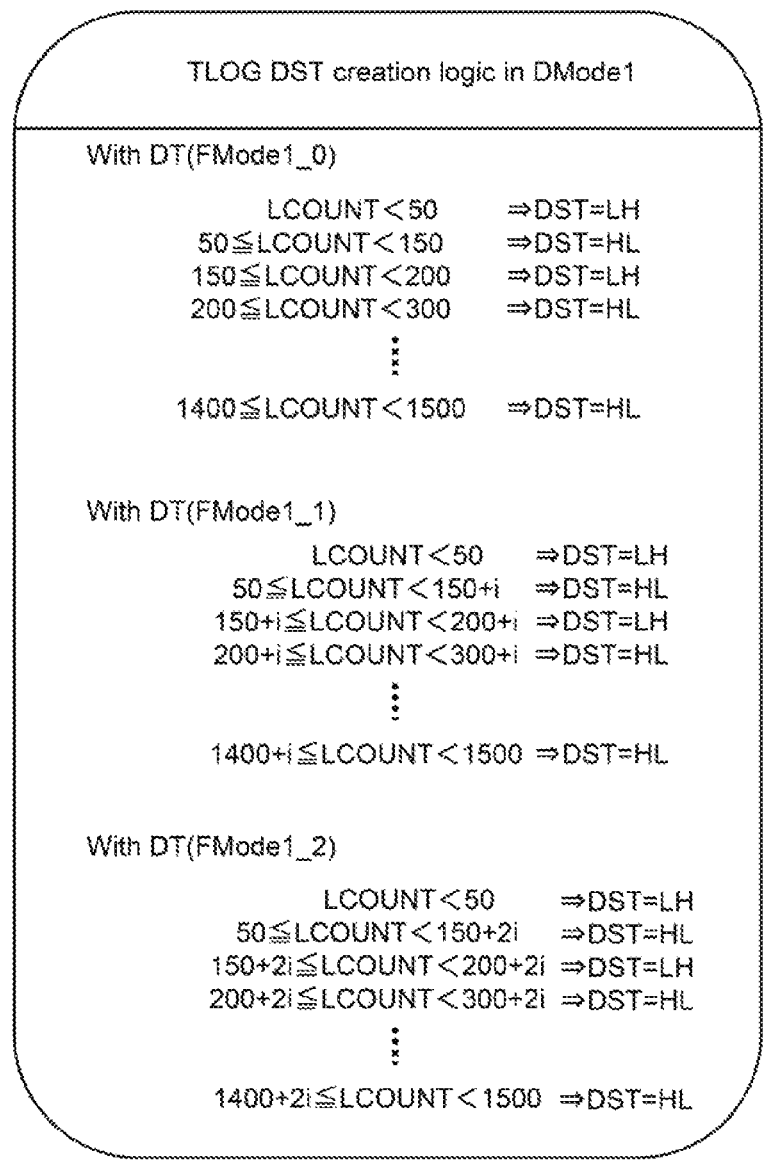
FIG. 11 is an explanatory diagram showing, by example, the logic of status signal creation by a second control logic in the first display mode.
Figure 12:
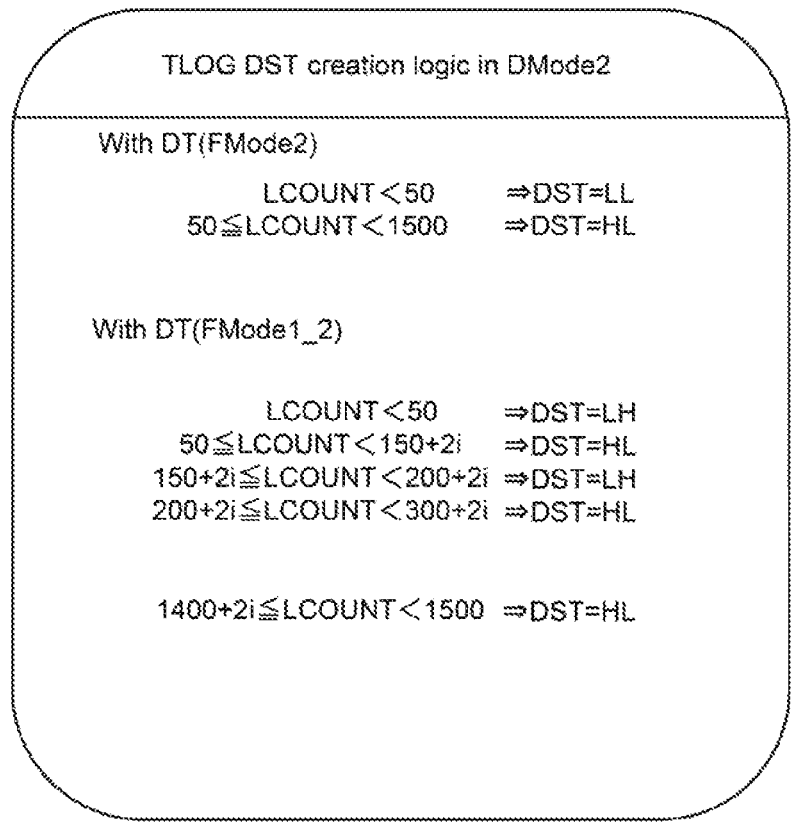
FIG. 12 is an explanatory diagram showing, by example, the logic of status signal creation by the second control logic in the second display mode.

The second control logic 34 produces status signals DST in turn according to the count value of the line counter 31 in each display frame period every time the count value reaches the start timing of each of the display drive term DISP and the non-display drive term LHB in a display frame period, which are defined by the control data selected by the first control logic 33. The line counter 31 counts up the display line clock signal LCK; its count value is reset by the internal frame synchronizing signal IVSYNC in each display frame period. The creation logic of the status signal DST created by the second control logic 34 with the control data selected in the first display mode DMode1 is as illustrated in FIG. 11. The creation logic of the status signal DST created by the control logic 34 with the control data selected in the second display mode DMode2 is as illustrated in FIG. 12, for example. Although no special restriction is intended, the status signal DST is a code d0d1 of 2 bits; "d0" directs the display action when taking H (e.g. a logical value "1"), and it makes a direction for suppressing the display action when taking L (e.g. a logical value "0"); and "d1" directs the touch detection action when taking H, and it makes a direction for suppressing the touch detection action when taking L. Further, the second control logic outputs a mode-determination signal DISmd showing whether the control in the first frame mode FMode1 or the control in the second frame mode FMode2 is currently performed according to the control data selected by the first control logic 33.

The creation logic shown in FIG. 11 by example, corresponds to the action flow of FIG. 9; a display drive term DISP where the display action is performed, and a non-display drive term LHB where the touch detection action is performed are alternately created in each display frame period FLM. In other words, in such a case that the frequency of performing a touch operation is high, the display action and the touch detection action are performed exclusively in each display frame period according to the first display mode DMode1.

The creation logic shown in FIG. 12, by example corresponds to the action flow of FIG. 8. Within the first and second display frame periods of a series of three display frame periods, the display term DISP in which the display action is performed and the non-display term LHB in which the touch detection action is suppressed are created alternately in each display frame period FLM; and in the last display frame period FLM, the display term DISP in which the display action is performed, and the non-display term LHB in which the touch detection action is performed are created alternately. In such a case that the frequency of performing a touch operation is high, the display action and the touch detection action are performed exclusively in each display frame period. In other words, in such a case that the frequency of performing a touch operation is low, the display action and the touch detection action are performed exclusively only in the last display frame period of the plurality of display frame periods according to the second display mode DMode2.

The third control logic 35 is supplied with a command CMD and a command parameter CDATA from the host device 5 together with the status signal DST and the mode-determination signal DISmd, and further supplied with the count value of the interval counter 37. The interval counter 37 counts up reference clock signals SCK in each cycle of the display line clock signal LCK, of which the count value is a value arranged so that a plurality of steps are assigned to one cycle of the display line clock signal LCK. The third control logic 35 uses the count value of the interval counter 37, the status signal DST, the mode-determination signal DISmd, the result of decoding the command CMD, and the command parameter CDATA to produce the control signals CNT1, CNT2, CNT3, CNT4 and CNT5, and the internal horizontal synchronizing signal IHSYNC. The control signals CNT1, CNT2, CNT3, CNT4 and CNT5 are produced in synchronization with the reference clock signal SCK, the display line clock signal LCK, and the internal frame synchronizing signal IVSYNC depending on their control functions.

The third control logic accepts the input of the control data DT (Tmg1-1) and the DT (Tmg1-2) set on the clock control register 27, and takes, from a value of the mode-determination signal DISmd, information about whether the current action mode is the first frame mode FMode1 or the second frame mode FMode2. In case that the mode-determination signal DISmd shows the first frame mode, the third control logic supplies the clock pulse generator 28 with a frequency control signal for controlling the display line clock signal LCK to have a frequency of a cycle indicated by the control data DT (Tmg1-1). In case that the mode-determination signal DISmd shows the second frame mode, the third control logic supplies the clock pulse generator 28 with a frequency control signal for controlling the display line clock signal LCK to have a frequency of a cycle indicated by the control data DT (Tmg1-2). The frequency control signals are included in the control signal CNT5. In this embodiment, the control data are frequency division number data for the reference clock signal SCK, whereby the clock frequency is defined.

The third control logic 35 accepts the input of the control data DT (Tmg2) and DT (Tmg3) set on the clock control register 27, and it supplies the signal line drive circuit 21 with a timing signal when the count value of the interval counter 37 coincides with the value of the control data DT (Tmg3), whereby the signal line drive circuit 21 is switched in signal voltage output after the elapse of the interval Tmg3 from a rising edge of the display line clock signal LCK as illustrated in FIGS. 16 and 17. The timing signal thereof is included in the control signal CNT2.

In addition, the third control logic 35 supplies the scan line select circuit 20 with a timing signal when the count value of the interval counter 37 coincides with the value of the control data DT (Tmg2). The scan line select circuit 20 sequentially produces and outputs scan line select clock signals GCK1 to GCK4 of four phases with a predetermined pulse width in synchronization with the display line clock signal LCK. For instance, it is supposed that the scan line select clock signals GCK1 to GCK4 are raised in turn while being delayed from one another by one cycle of the display line clock signal LCK, and each scan line select clock signal falls down in line with the third cycle of the display line clock signal LCK as illustrated in FIGS. 16 and 17, the falling arises with the timing in line with the third cycle of the display line clock signal after the interval Tmg2 directed by the timing signal has elapsed from the rising. The timing signal is included in the control signal CNT1.

In a term of d0=H, i.e. a display drive term directed by the status signal DST, the third control logic 35 controls: the scan line drive circuit 20 in newly driving the scan electrode, the signal line drive circuit 21 in driving the signal electrodes, the line latch circuit 23 in latching additional display data, etc. Further, the control circuit 14 of the touch panel controller 6 supplied with the status signal DST performs the touch detection action on the touch frame in a term which is made a non-display drive term by the status signal DST of d1=H. In a term which is made anon-display drive term by the status signal DST of d0=L, the third control logic 35 suspends the scan line drive circuit 20 in newly driving the scan electrode, the signal line drive circuit 21 in driving the signal electrodes, the line latch circuit 23 in latching additional display data, etc., and it stops the display action in the term. Further, the control circuit 14 of the touch panel controller 6 supplied with the status signal DST performs the touch detection action on the touch frame in a term which is made a non-display term by the status signal DST of d1=H, and it suppresses the touch detection action on the touch frame when d1=L.

In the access control to the FIFO buffer 22, the write (push) and read (pop) are performed in a display drive term DISP in such a way that the FIFO buffer 22 is never made data empty. The transfer rate of display data from the host device 5 is slower than the display speed and therefore, the display data write action is performed on the FIFO buffer 22 in a non-display drive term LHB in order to assure that the FIFO buffer 22 is never brought into the data empty state during a display drive term DISP. To assure that the FIFO memory 22 is never driven data empty in a display drive term DISP, the first cycle Tmg1-1 is made a cycle which can assure that the intermittent read action at a speed faster than a write speed according to the display drive term never brings the FIFO memory 22 with display data written therein into the empty state during a display frame period in the first frame mode FMode1. The second cycle Tmg1-2 is made a cycle which can assure that the successive read action at a speed faster than a write speed never in a display drive term DISP never brings the FIFO memory 22 with display data written therein into the empty state during a display frame period in the second frame mode FMode2.

Each of the first to third control logics 33, 34 and 35 may be a hard wired logic or a program processing circuit of which the logical action depends on a software program such as firmware. The former is preferred from the viewpoint of higher processing, and the latter is preferred from the viewpoint of general versatility or flexible adaptability.

Figure 18:
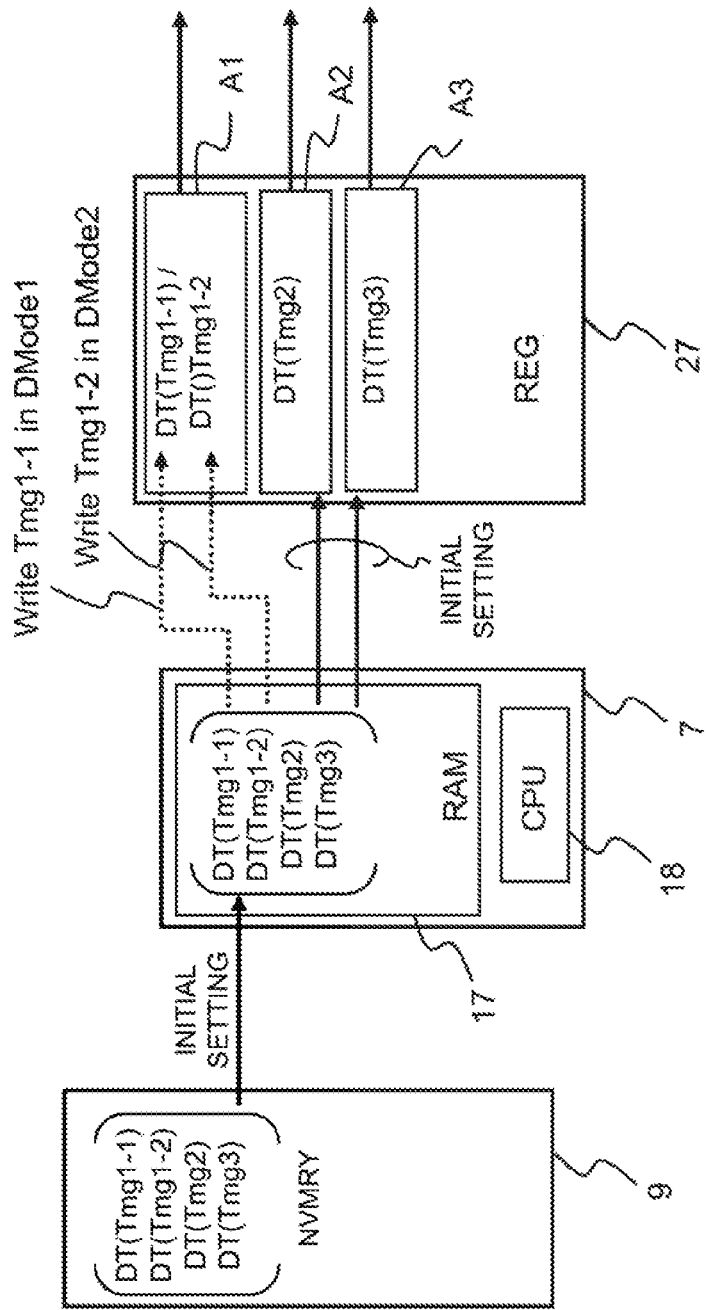
FIG. 18 is a block diagram showing the first method for setting first to fourth control data on a clock control register 27.
Figure 19:
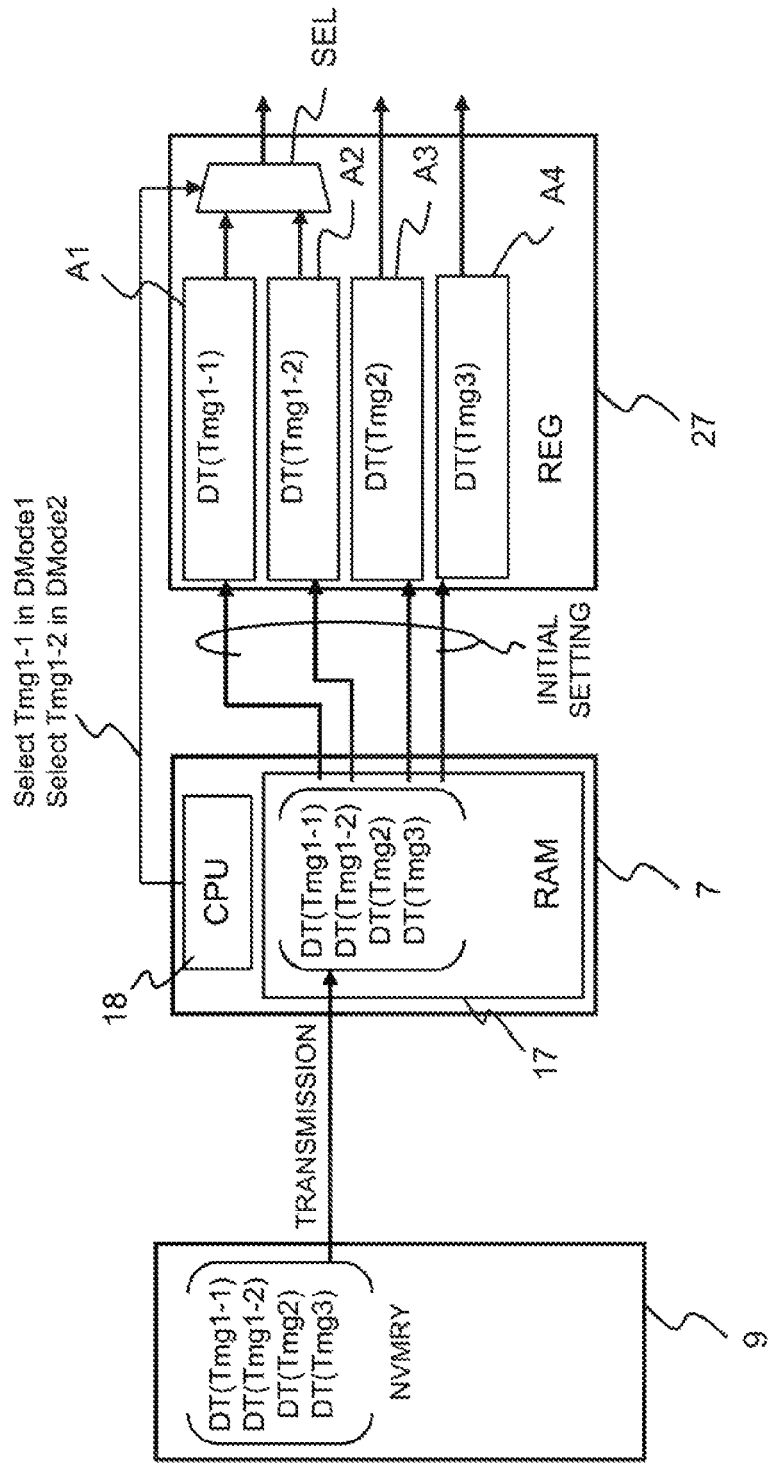
FIG. 19 is a block diagram showing the second method for setting the first to fourth control data on the clock control register 27.
Figure 20:
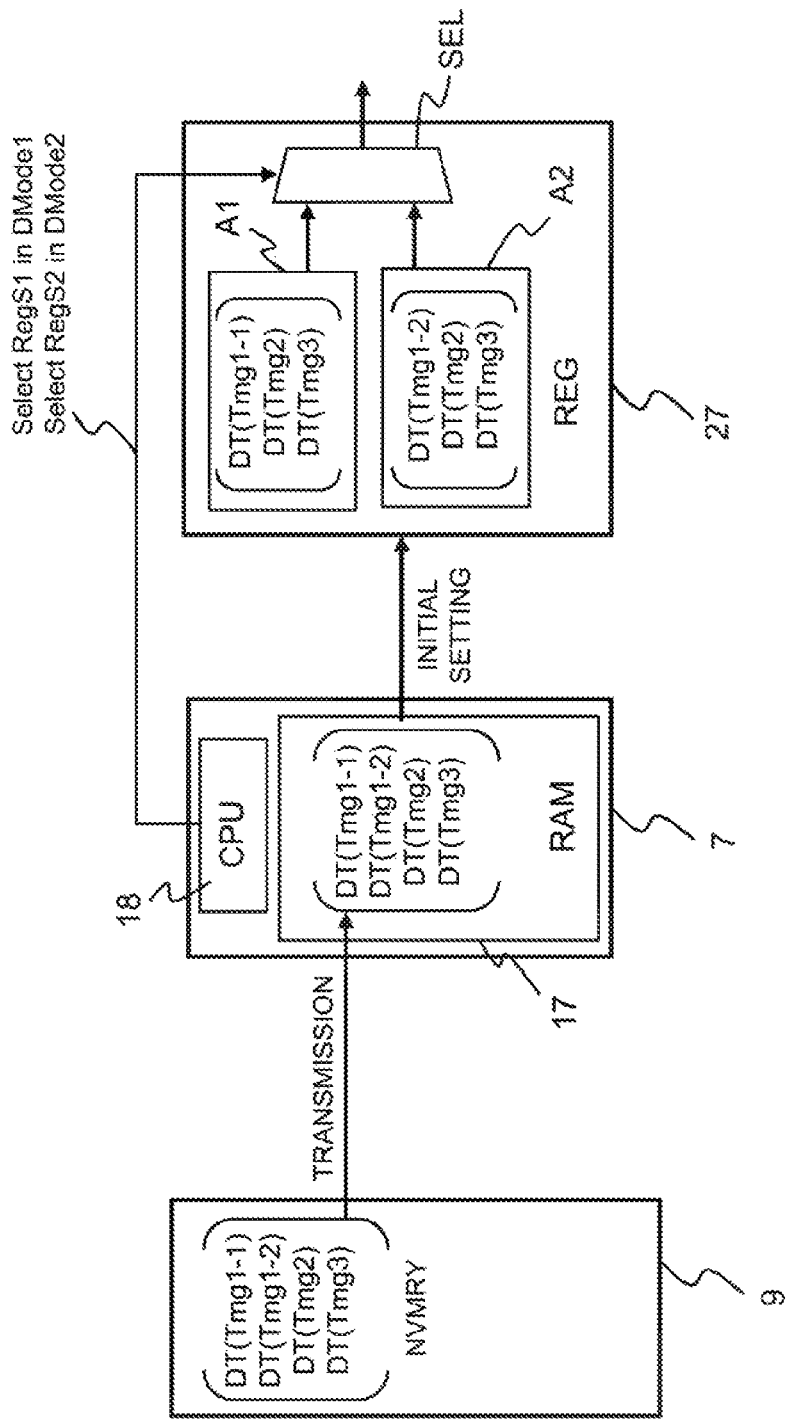
FIG. 20 is a block diagram showing the third method for setting the first to fourth control data on the clock control register 27.

The method for setting the control data DT (Tmg1-1), DT (Tmg1-2), DT (Tmg2) and DT (Tmg3) on the clock control register 27 is shown in FIG. 18 by example. On the power-on reset or system reset, the CPU transfers the control data DT (Tmg1-1), DT (Tmg1-2), DT (Tmg2) and DT (Tmg3) from the nonvolatile storage 89 to the RAM 17, initially sets the control data DT (Tmg2) and DT (Tmg3) of these control data in memory regions A2 and A3 of the clock control register 27, and sets the control data DT (Tmg1-1) in a region A1 in response to the designation of the first display mode DMode1 after that, and sets the control data DT (Tmg1-2) in the region A1 in response to the designation of the second display mode DMode2. Alternatively, as in FIG. 19, the method for setting the control data may be arranged so as to include the steps of: completing the initial setting of the control data DT (Tmg1-1), DT (Tmg1-2), DT (Tmg2) and DT (Tmg3) in the memory regions A1, A2, A3 and A4 of the clock control register 27 at reset; selecting the control data DT (Tmg1-1) in the region A1 by a selector SEL in response to the designation of the first display mode DMode1 after that; and selecting the control data DT (Tmg1-2) in the region A2 in response to the designation of the second display mode DMode2. Further, as in FIG. 20, the method for setting the control data may be arranged so as to include the steps of: initially setting the control data DT (Tmg1-1), DT (Tmg2) and DT (Tmg3) which are used in the first display mode DMode1 in the memory region A1 of the clock control register 27; initially setting the control data DT (Tmg1-2), DT (Tmg2) and DT (Tmg3) which are used in the second display mode DMode2 in the memory region A2 of the clock control register 27; selecting the control data DT (Tmg1-1), DT (Tmg2) and DT (Tmg3) in the region A1 by the selector SEL in response to the designation of the first display mode DMode1 after that; and selecting the control data DT (Tmg1-2), DT (Tmg2) and DT (Tmg3) in the region A2 in response to the designation of the second display mode DMode2.

The drive control device 4 as described above brings about the effects and advantages as described below.

(1) It is possible to suppress the phenomenon of an undesired brightness difference appearing at a fixed location in a display frame FLM owing to no display, and the phenomenon of occurrence of flicker attributed to such undesired brightness difference. This is because the display drive term DISP and the non-display drive term LHB are changed in start timing on the basis of the display frame period FLM in the first frame mode FMode1. In the second frame mode FMode2, one display drive term DISP is involved in the display frame mode, and the display drive term DISP is not interrupted by the non-display drive term halfway and as such, no flicker arises on its display screen in the display drive period to begin with. Since the control arranged in consideration of keeping the start timing of a display drive term of the first frame mode FMode1, which is sequentially changed among display frames from being coincident with the start timing of a display drive term of the second frame mode FMode2 is not required at all, the control of the frame mode is simplified.

(2) The way to use the first and second frame modes, or the combination thereof is changed based on the result of touch detection as in the first display mode DMode1 and the second display mode DMode2. Therefore, a measure to start the display drive term DISP and the non-display drive term LHB with the timing which fits a request from a system using the drive control device 4 can be taken readily. For instance, in the case of performing the display action at a speed faster than a transfer rate of display data supplied from the host device with no frame buffer memory prepared, a non-display term needs to be provided in order to accumulate display data to be displayed subsequently in the FIFO buffer even if the touch detection action is not performed. Further, in case that the state of no touch detection lasts for a fixed length of time, power consumption can be decreased by lowering the frequency of touch detection. To comply with such needs, the start timing of a display drive term DISP and the start timing of a non-display drive term LHB in a display frame period FLM can be changed based on the result of touch detection readily.

(3) As described with reference to FIG. 5, the control arranged so that control data of the first frame mode FMode1 are used to increase the first display term by a predetermined length of time, and to decrease the last display term by the predetermined length of time in each display frame period FLM is performed, provided that the predetermined length of time is gradually increased. Therefore, the control for changing, in start timing, a display drive term DISP and a non-display drive term LHB in each display frame period FLM is facilitated.

(4) By using the first frame mode FMode1 which allows the display action in a display drive term DISP and the touch detection action in a non-display drive term LHB, the noise caused by one of the touch detection action and the display action is prevented from affecting the other action.

(5) An FIFO memory 22 of a capacity smaller than the data size of a display frame can be used. Therefore, it is possible to make contribution to the downsizing of a drive control device further than an embodiment arranged to mount a frame buffer on such a device.

While the disclosure has been concretely described based on the embodiments, the disclosure is not limited to the embodiments. Various kinds of changes or modifications may be made without departing from the subject matter thereof.

FIG. 21 shows another embodiment of the first display mode DMode1. While in the embodiment of FIG. 9, display and non-display drive terms are changed in start timing in each display frame, the embodiments are not limited thereto. The display and non-display drive terms may be changed in start timing for every plurality of display frames, e.g. two display frames as shown in FIG. 23. In this case, a count clock signal of the counter 30 may be e.g. a clock signal having double the frequency of the internal frame synchronizing signal IVSYNC.

Referring to FIGS. 22 and 23, an embodiment in which the second and third intervals are different from each other is shown. In the embodiment of FIGS. 16 and 17, the second interval Tmg2 and the third interval Tmg3 are set to values common to the first and second frame modes in any of the first frame mode in which the cycle of the display line clock signal LCK is the first cycle Tmg1-1, and the second frame mode in which the cycle of the display line clock signal LCK is the second cycle Tmg1-2 longer than the first cycle. Other embodiments may also be implemented. As shown in FIG. 22, a second interval Tmg2-1 and a third interval Tmg3-1 may be set in the first frame mode FMode1 in which the cycle of the display line clock signal LCK is the first cycle Tmg1-1; and as shown in FIG. 23, a second interval Tmg2-2 and a third interval Tmg3-3 may be set in the second frame mode FMode2 in which the cycle of the display line clock signal LCK is a second cycle Tmg1-2. In this embodiment, the following relation is maintained: "Tmg2-1"–"Tmg3-1"="Tmg2-2"–"Tmg3-2". In this case, the third control data are DT (Tmg2-1) and DT (Tmg2-2), and the fourth control data are DT (Tmg3) and DT (Tmg3-2). While the effect and advantage thereof is the same as those achieved by the embodiment of FIGS. 16 and 17, the number of interval set data is increased.

The buffer memory is not limited to the FIFO memory 22. It may be a RAM, or a frame buffer memory formed by RAM.

The way to change the start timings of display and non-display terms in the first frame mode FMode1 is not limited to one of defining each term by the clock number of the horizontal synchronizing clocks as described with reference to FIG. 5. The start timing of each term may be defined by a time or value of the number of counted clocks, previously determined by use of a mathematical formula, or appropriately changed.

The first non-display drive term LHB of the second frame mode may be part of a back porch; there is no disadvantage even if the boundary of the back porch BCKP and the non-display drive term is not clear. It is adequate as long as the start timing of the subsequent display drive term is clear.

In addition, the control logics of the display control part are not limited to the logics described with reference to FIGS. 1, 11, 12, etc. They can be changed appropriately. The control logics are not limited to the method of using a coefficient value of reference clock signals for interval control. The control may be arranged so as to use another piece of time information or the like. The values of "i" and "j" in FIGS. 5 and 6 may be decided appropriately. The values of "n" and "m" are not limited to 2, and they may be decided appropriately. As a matter of course, the count-up value of the frame counter 30 can be set variably.

The display panel to be driven may be an electroluminescence panel or the like. The structure of a display panel targeted for driving is not limited to that shown in FIG. 3. The drive control device may be arranged by mounting, on a circuit board, the touch controller 6, the microprocessor 7 and the display controller 8, which are formed in semiconductor chips respectively. The disclosure is widely applicable to not only portable information terminal devices, such as a tablet and a smart phone, but also other information terminal devices.

What is claimed is:

1. A panel driver configured to control a panel having display elements and touch detection electrodes, comprising:
 a display controller configured to select a display line out of the display elements and provide a display signal to the display line during a display interval;
 a touch controller configured to control the touch detection electrodes during a non-display interval,
 wherein the display controller includes a control circuit to control first and second frame modes, and a clock pulse generator ("CPG") to generate a display line clock signal synchronized with a display line switching signal;
 wherein:
  in the first frame mode, the non-display interval and the display interval are alternately created generated multiple times during a time interval between opposing blanking intervals of each display frame period, and the touch controller is configured to accept touch detection directive during the non-display interval;
  in the second frame mode, the non-display interval and the display interval subsequent thereto are generated in a time interval between opposing blanking intervals of each display frame period, and the touch controller does not accept a touch detection directive during the non-display interval; and
  in the first frame mode, the control circuit is further configured to change the display interval and the subsequent non-display interval to start timing on an individual display frame period basis for every plurality of display frame periods;
 wherein the CPG is configured to output a display line clock signal of a first cycle in the first frame mode, and output a display line clock signal of a second cycle longer than the first cycle in the second frame mode;
 wherein the control circuit comprises a first control logic configured to:
  count the cycle number of the display line clock signal in each display frame period and, in parallel, sequentially generate produce status signals when the count value reaches the start timing of each of the display and non-display drive intervals in the display frame period, and
  output a mode-determination signal indicating whether the status signals are for the first frame mode or the second frame mode; and
 wherein:
  the touch controller is further configured to receive the status signals and generate touch control signals for touch detection according to the received status signals; and
  the control circuit further comprises a second control logic configured to receive the mode-determination signal from the first control logic and, based at least in part on the mode-determination signal, supply the CPG with:
   a first control signal when the mode-determination signal indicates the first frame mode, and
   a second control signal when the mode-determination signal indicates the second frame mode.

2. The panel driver of claim 1, wherein:
 the display controller has a scan line drive circuit operable to output scan line select clock signals for sequentially selecting the scan lines of the display elements, and a signal line drive circuit operable to supply display drive signals to the display elements of the selected scan lines;
 the scan line drive circuit is configured to change, in pulse, the scan line select clock signals in synchronization with the display line clock signal;
 the signal line drive circuit is configured to switch the display drive signals in synchronization with the display line clock signal; and
 the scan line drive circuit is configured to output the scan line select clock signals so that a first interval from a timing of output switching of display drive signals to scan line nonselect pulse change of the scan line select clock signals remains unchanged between a case where the cycle of the display line clock signal is the first cycle and a case where the cycle of the display line clock signal is the second cycle.

3. The panel driver of claim 2, wherein:
 the first interval is a difference of a third interval from a second interval;
 the scan line drive circuit is configured to change the scan line select clock signals to scan line nonselect pulses when the second interval elapses from the pulse change of the display line clock signal; and the signal line drive circuit is configured to switch the output of the display drive signals when the third interval elapses from the pulse change of the display line clock signal.

4. The panel driver of claim 2, wherein the control circuit is configured to issue directives for the first and second cycles to the clock pulse generator, issue a directive for a second interval to the scan line drive circuit, and issue a directive for a third interval to the signal line drive circuit.

5. The panel driver of claim 4, wherein the control circuit is configured to rewritably set a clock control register with first control data to specify the first cycle, second control data to specify the second cycle, third control data to specify the second interval, and fourth control data to specify the third interval, and
the control circuit is configured to issue directives for the first cycle, the second cycle, the second interval and the third interval based on the first to fourth control data set on the clock control register.

6. The panel driver of claim 5, further comprising a microprocessor operable to determine a touch or no touch based on signals obtained by the touch controller in during touch detection,
wherein the microprocessor is configured to set the first to fourth control data on the clock control register.

7. The panel driver of claim 1, wherein:
the display controller has a buffer memory into which display data are written in synchronization with an external horizontal synchronizing signal of a cycle longer than the second cycle, and from which display data are read in synchronization with the display line clock signal;
the first cycle is a cycle of sufficient length to insure that an intermittent read action at a speed faster than a write speed in the display interval does not cause brings the buffer memory to enter an empty state during a display frame period in the first frame mode; and
the second cycle is a cycle of sufficient length to insure that a successive read action at a speed faster than the write speed in the display interval does not cause brings the buffer memory to enter the empty state during a display frame period in the second frame mode.

8. The panel driver of claim 1, wherein the control circuit is configured to perform, as control for changing the display and non-display intervals in start timing on an individual display frame period basis, control arranged so as to gradually increase, in each display frame period, the first display interval by a predetermined length of time and shorten the last display interval by the predetermined length of time.

9. The panel driver of claim 1, further comprising:
a microprocessor operable to determine a touch or no touch based on signals obtained by the touch controller in during touch detection;
wherein the display controller further comprises:
a start timing register for rewritably holding fifth control data for defining the start timing of the display interval and the start timing of the non-display interval subsequent thereto on an individual display frame period basis for every plurality of display frame periods according to the first frame mode, and the sixth control data for defining the start timing of the display interval on an individual display frame period basis according to the second frame mode; and
wherein the control logic is further configured to select the fifth or sixth control data from the start timing register and provide, based on the selected control data, control signals for the corresponding display and non-display intervals in each display frame period according to the specified display mode; and
wherein the microprocessor specifies the display mode.

10. The panel driver of claim 9, wherein the microprocessor is configured to set the fifth and sixth control data on the start timing register.

11. The panel driver of claim 9, wherein the fifth and sixth control data respectively define the start timing of each of the display and non-display interval by a clock cycle number of the display line clock signal.

12. The panel driver of claim 11, wherein the control logic comprises:
first control logic configured to select required data from among the fifth and sixth control data in each display frame period according to the display mode specified by the microprocessor;
second control logic configured to count the cycle number of the display line clock signal in each display frame period and, in parallel, produce the status signals based on the data selected by the first control logic; and
third control logic configured to receive the status signals and produce display control signals according to the received status signals.

13. The panel driver of claim 1, further comprising a microprocessor operable to determine a touch or no touch based on signals obtained by the touch controller during the non-display interval, wherein:
the microprocessor is configured to notify the display controller of:
a second display mode in which the plurality of display frame periods are handled as one unit subsequently to its reset processing, provided that the second display mode is arranged to:
execute the second frame mode in a portion of the plurality of display frame periods, and
execute the first frame mode in the last display frame period of the plurality of display frame periods;
a first display mode in which the plurality of display frame periods are handled as one unit in the event of detection of a touch after notification of the second display mode, provided that the first display mode is arranged to continue the first frame mode; and
the second display mode in case that a given length of time has elapsed without any a touch being undetected since the notification of the first display mode.

14. The panel driver of claim 13, formed as a semiconductor integrated circuit on a semiconductor substrate.

15. A system, comprising:
a panel having display elements and touch detection electrodes arranged therein;
a panel driver operable to control the panel; and
a host device operable to supply display data to the panel driver,
the panel driver comprising:
a display controller configured to select a display line out of the display elements and provide a display signal to the display line during a display interval;
a touch controller configured to control the touch detection electrodes during a non-display interval,
a microprocessor configured to determine a touch or no touch based on signals obtained by the touch controller during the non-display interval;
wherein the display controller further comprises:
a CPG operable to produce a display line clock signal in synchronization with a display line switching cycle;

a control circuit operable to control first and second frame modes, wherein:
  in the first frame mode, the non-display interval and the display interval are alternately generated multiple times during a time interval between opposing blanking intervals of each display frame period, and the touch controller is configured to accept a touch detection directive during the non-display interval;
  in the second frame mode, the non-display interval and the display interval subsequent thereto are generated in a time interval between opposing blanking intervals of each display frame period, and the touch controller does not accept a touch detection directive during the non-display interval;
  in the first frame mode, the control circuit is further configured to change the display interval and the subsequent non-display interval to start timing on an individual display frame period basis for every plurality of display frame periods;
  the CPG is configured to output display line clock signal of a first cycle in the first frame mode, and output a display line clock signal of a second cycle, longer than the first cycle, in the second frame mode;
wherein the control circuit comprises a first control logic configured to count the cycle number of the display line clock signal in each display frame period and, in parallel, sequentially generate status signals when the count value reaches the start timing of each of the display and non-display intervals in the display frame period and output a mode-determination signal indicating whether the status signals are for the first frame mode or the second frame mode; and
wherein the touch controller is further configured to receive the status signals, and generate touch control signals for touch detection according to the received status signals; and
wherein the control circuit further comprises a second control logic, configured to receive the mode-determination signal from the first control logic and, based at least in part on the mode determination signal, supply the CPG with:
  a first control signal when the mode-determination signal indicates the first frame mode, and
  a second control signal when the mode-determination signal indicates the second frame mode.

16. The system according to claim 15, wherein:
the display controller has a scan line drive circuit operable to output scan line select clock signals for sequentially selecting the scan lines of the display elements, and a signal line drive circuit operable to supply display drive signals to display elements of the selected scan lines;
the scan line drive circuit is configured to change, in pulse, the scan line select clock signals in synchronization with the display line clock signal;
the signal line drive circuit is configured to switch the display drive signals in synchronization with the display line clock signal; and
the scan line drive circuit is configured to output the scan line select clock signals so that a first interval from a timing of output switching of display drive signals to scan line nonselect pulse change of the scan line select clock signals remains unchanged between a case where the cycle of the display line clock signal is the first cycle and a case where the cycle of the display line clock signal is the second cycle.

17. The system according to claim 16, wherein:
the first interval is a difference of a third interval from a second interval;
the scan line drive circuit is configured to change the scan line select clock signals to scan line nonselect pulses when the second interval elapses from the pulse change of the display line clock signal; and
the signal line drive circuit is configured to switch the output of the display drive signals when the third interval elapses from the pulse change of the display line clock signal.

18. The system according to claim 17, wherein:
the display controller has a buffer memory into which display data are written in synchronization with an external horizontal synchronizing signal of a cycle longer than the second cycle, and from which display data are read in synchronization with the display line clock signal;
the first cycle is a cycle of sufficient length to insure that an intermittent read action at a speed faster than a write speed in the display interval does not cause the buffer memory to enter an empty state during a display frame period in the first frame mode; and
the second cycle is a cycle of sufficient length to insure that a successive read action at a speed faster than the write speed in the display interval does not cause the buffer memory to enter the empty state during a display frame period in the second frame mode.

19. The system according to claim 18, further comprising:
a nonvolatile storage in which are rewritably stored:
first control data for specifying the first cycle, second control data for specifying the second cycle, third control data for specifying the second interval, and fourth control data for specifying the third interval; and
wherein the control circuit is further configured to:
  rewritably set a clock control register with the first to fourth control data transmitted from the nonvolatile storage, and
  issue directions for the first cycle, the second cycle, the second interval and the third interval based on the first to fourth control data.

20. The system according to claim 19, wherein the microprocessor is further configured to respectively set the first to through fourth control data on the clock control register.

* * * * *